United States Patent [19]

Cheng et al.

[11] Patent Number: 4,810,274
[45] Date of Patent: Mar. 7, 1989

[54] VACUUM FREEZING AMBIENT PRESSURE MELTING (VFAPM) PROCESS AND SUB-TRIPLE POINT VAPOR PROCESSING UNIT FOR USE THEREIN

[76] Inventors: Chen-Yen Cheng; Sing-Wang Cheng, both of 730 A Rankin Rd., NE., Albuquerque, N. Mex. 87107

[21] Appl. No.: 2,124

[22] Filed: Jan. 12, 1987

[51] Int. Cl.[4] ................................................ F25J 5/00
[52] U.S. Cl. ......................................... 62/12; 62/532; 62/542
[58] Field of Search ............................ 62/12, 532, 542

[56] References Cited

U.S. PATENT DOCUMENTS

| | | | |
|---|---|---|---|
| 4,378,984 | 4/1983 | Cheng et al. | 62/12 |
| 4,451,273 | 5/1984 | Cheng et al. | 62/12 |
| 4,489,571 | 12/1984 | Cheng et al. | 62/542 |
| 4,505,728 | 3/1985 | Cheng et al. | 62/542 |
| 4,578,093 | 3/1986 | Cheng et al. | 62/12 |

*Primary Examiner*—Ronald C. Capossela

[57] ABSTRACT

A new vacuum freezing separation process entitled "Vacuum Freezing Ambient Pressure Melting (VFAPM) Process" and a new apparatus entitled ¢Sub-Triple Point Vapor Processing Unit" for generating and liquefying a sub-triple point vapor have been introduced. The process is useful in desalination, concentration of industrial solutions, water reuse and pollution abatement. The vapor processing unit can be used in vacuum freezing processes, distillative freezing processes, freeze-drying processes and other processes in which sub-triple point vapors are generated and are to be liquefied.

The VFAPM Process is conducted in two processing zones, a vacuum processing zone and an ambient pressure processing zone. A vacuum freezing operation of generating a first vapor (a sub-triple point vapor) and a first condensed mass containing solvent crystals and a two-stage liquefaction of the first vapor are conducted in the vacuum processing zone; a crystal washing operation and a crystal melting operation are conducted in the ambient pressure processing zone. The Sub-Triple Point Vapor Processing Unit is an apparatus for generating a sub-triple point vapor and subjecting the vapor to a two-stage liquefaction operation involving a desublimation operation and a desublimate melting operation. The VFAPM Process is insensitive to corrosion, scale formation and fouling problems. It can handle many chemicals and solutions and it can attain a high degree of concentration of various industrial solutions and polluted solutions.

40 Claims, 8 Drawing Sheets

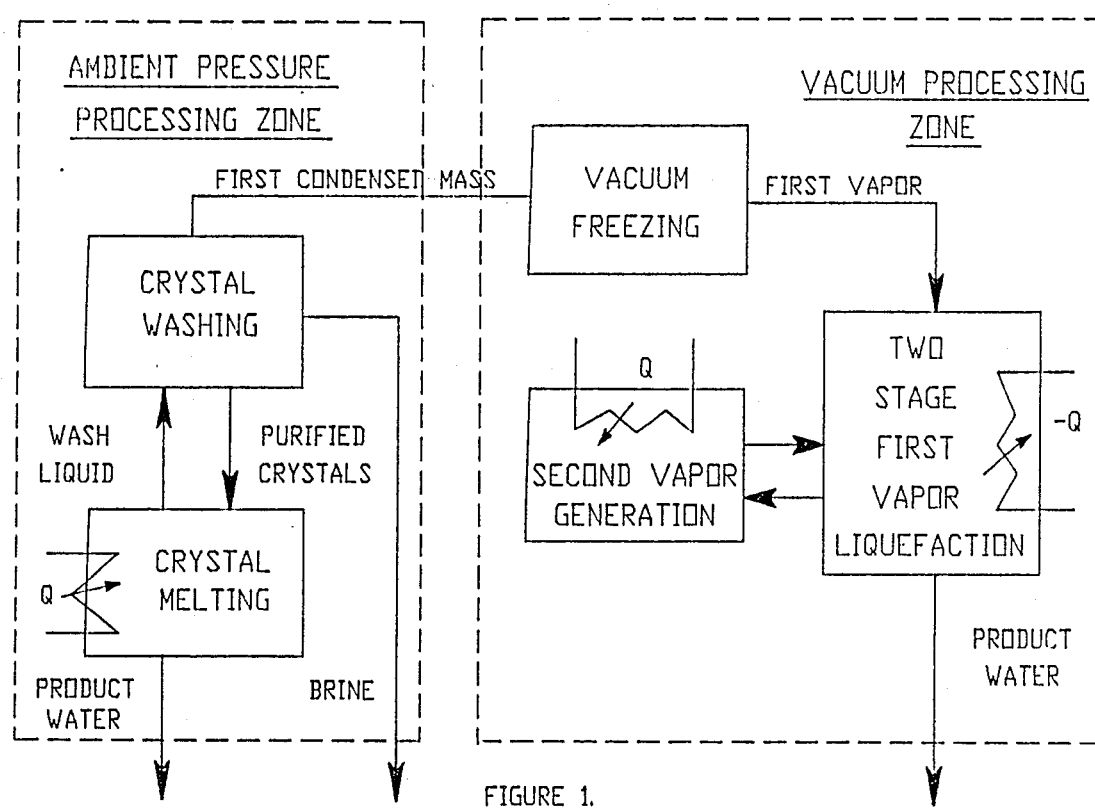
FIGURE 1.
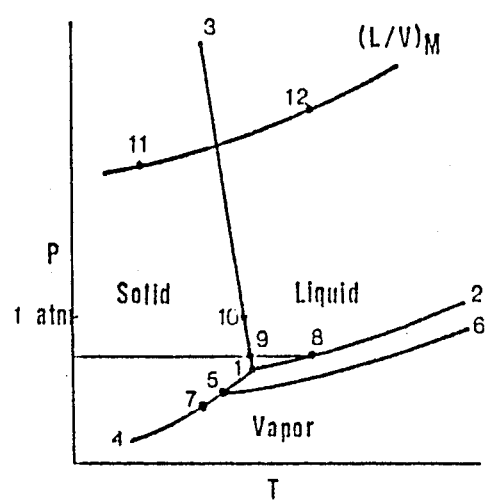
FIGURE 2-A.
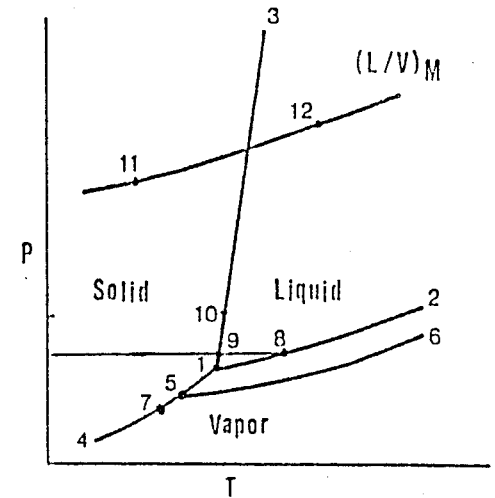
FIGURE 2-B.
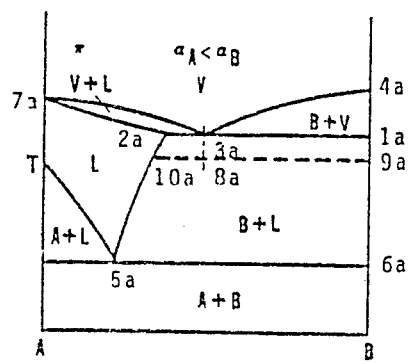
FIGURE 3.

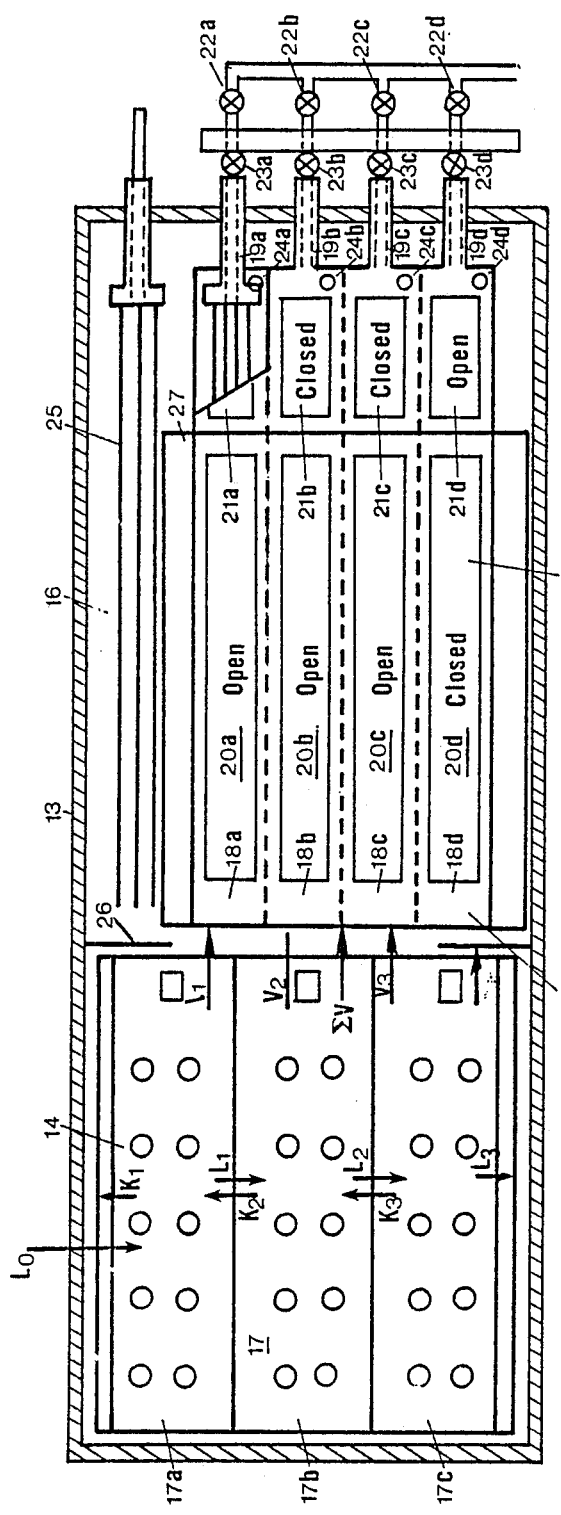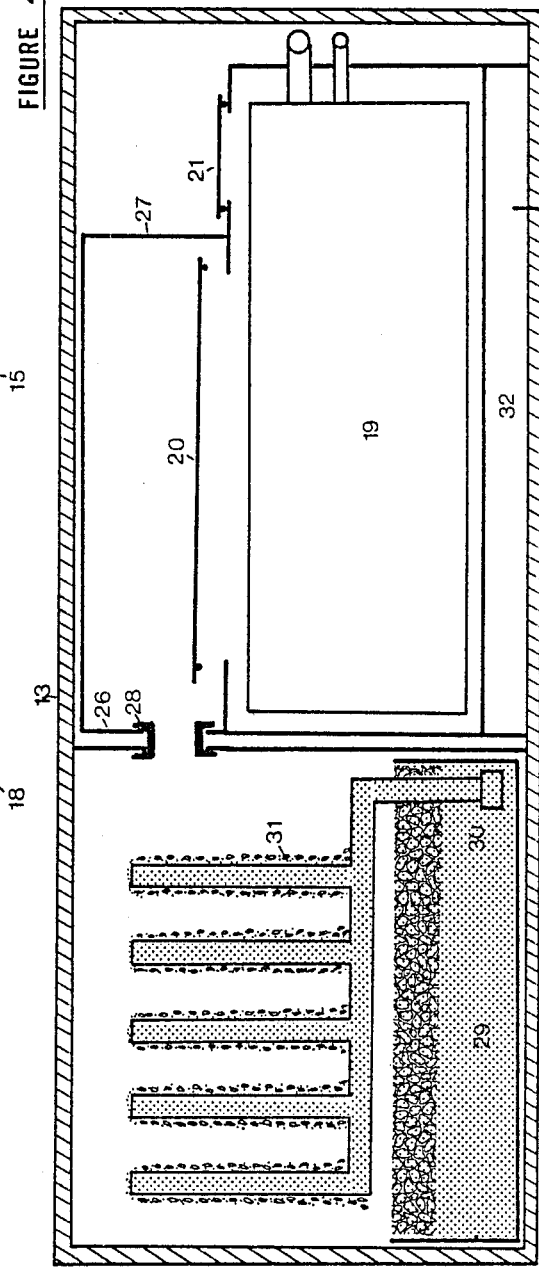

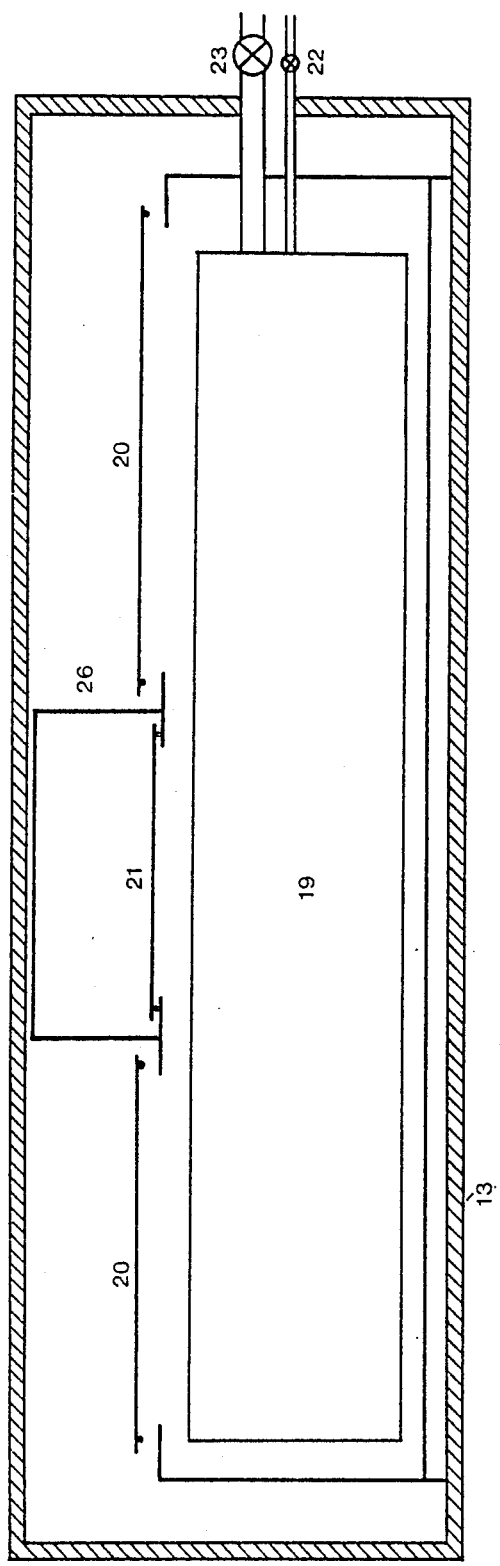
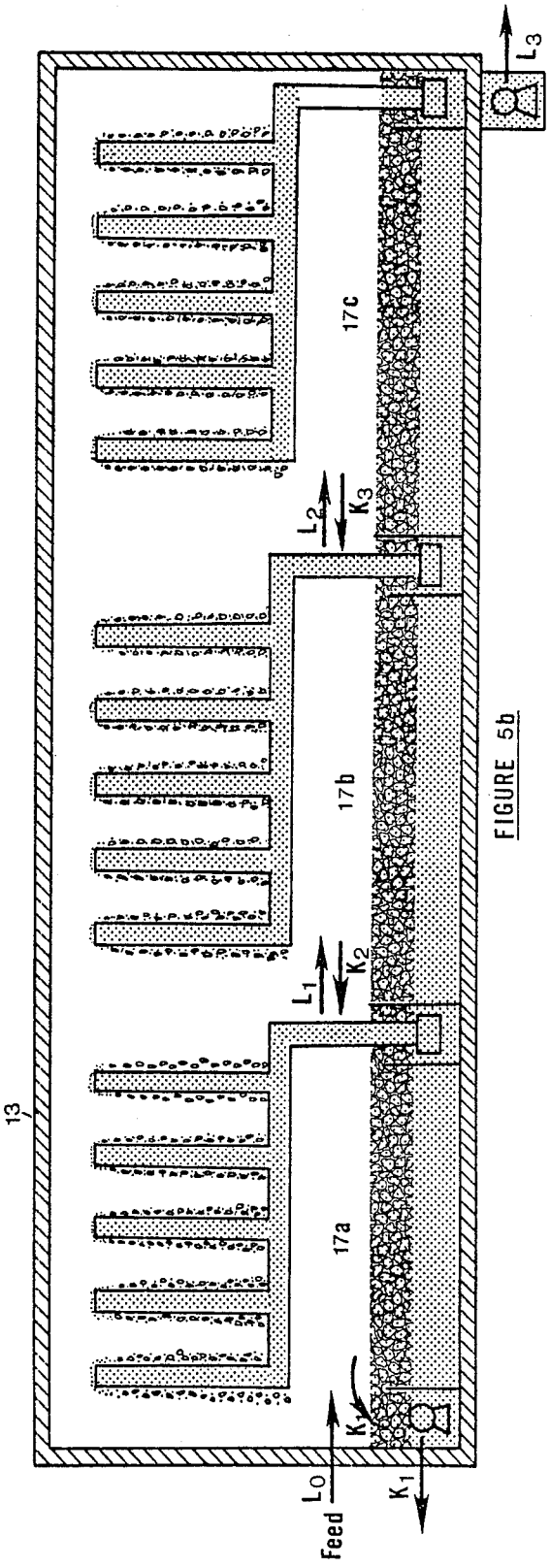
FIGURE 5c
FIGURE 5b

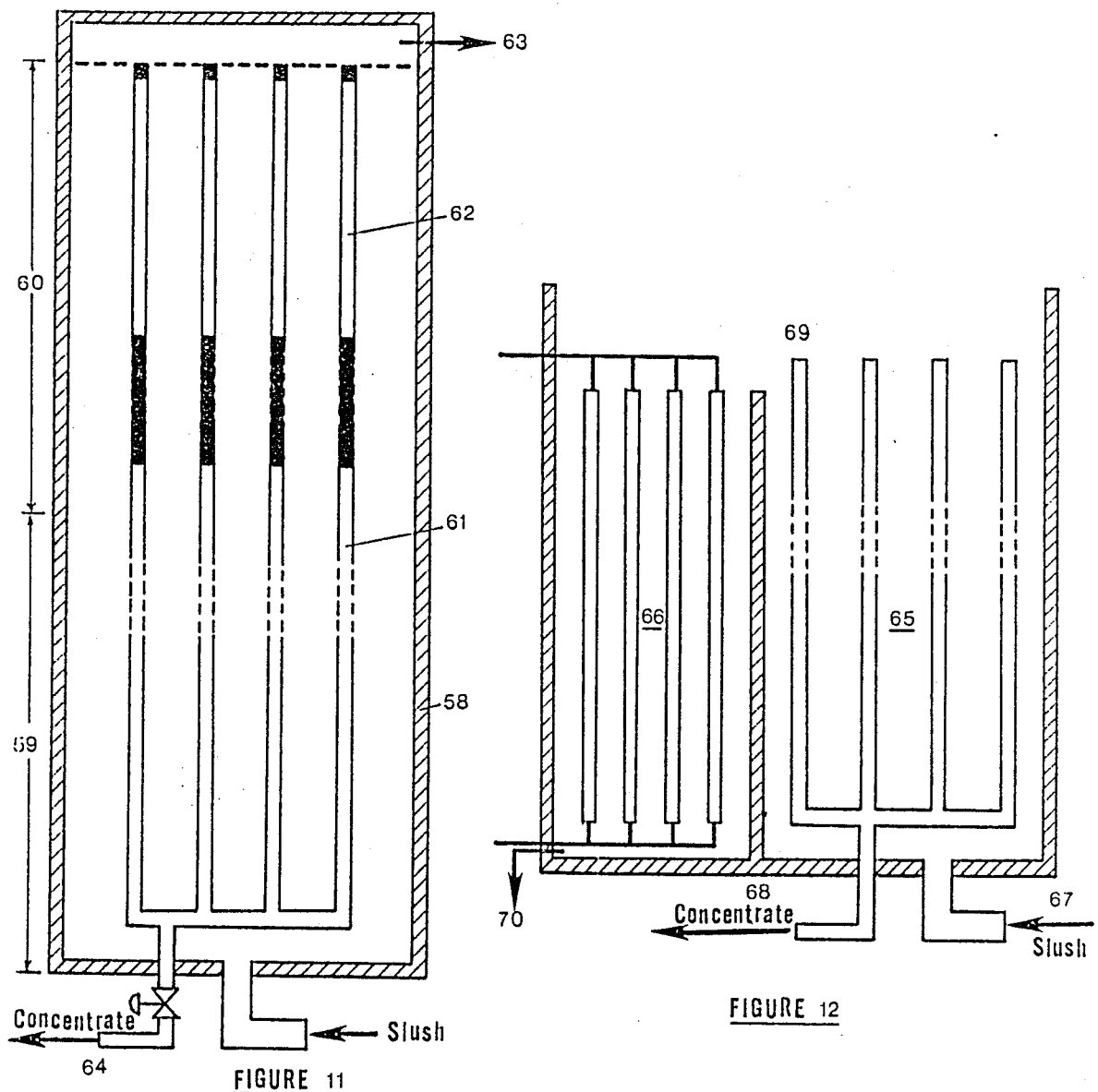
FIGURE 11
FIGURE 12
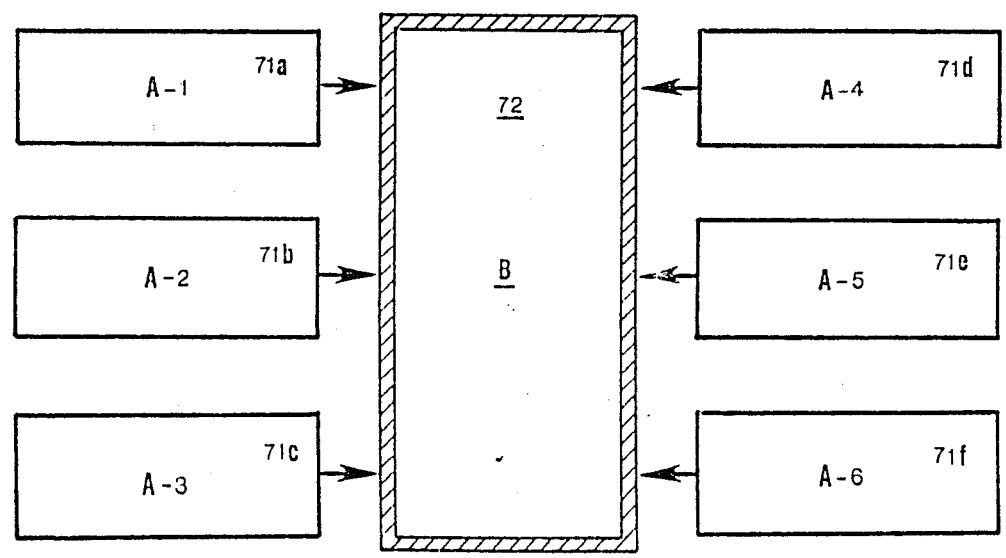
FIGURE 13

VACUUM FREEZING AMBIENT PRESSURE MELTING (VFAPM) PROCESS AND SUB-TRIPLE POINT VAPOR PROCESSING UNIT FOR USE THEREIN

BACKGROUND OF THE INVENTION

1. Field of Invention

The Vacuum Freezing Ambient Pressure Melting Process, denoted as the VFAPM Process, is a separation process that is useful in separating solvent from a solution that contains one or more low volatility or non-volatile solutes. It can be used in (a) desalination of sea water and brackish water, (b) water reuse, (c) pollution abatement, (d) concentration of aqueous and non-aqueous industrial solutions such as acid, alkali and salt solutions, (e) separations of solvents from solutions obtained in various extraction operations, (f) concentration of various juices such as orange, apple, tomato, beet and cane juices and (g) conditioning of aqueous and non-aqueous gels such as gelatin and waste water sludge.

A novel low pressure vapor generator and liquefier denoted as a "Sub-Triple Point Vapor Processing Unit" or simply as a "Sub-T.P. Vapor Processing Unit" has also been introduced. A sub-triple point vapor is defined as a vapor or a vapor mixture whose pressure is lower than the triple point pressure of the major component. A Sub-T.P. Vapor Processing Unit generates and liquefies a sub-triple point vapor by subjecting the vapor generated to a desublimation operation or a mixed condensation operation and a desublimate melting operation. Sub-T.P. Vapor Processing Units can be used in (a) various vacuum freezing processes such as the VFAPM Process of the present invention and the VFMPT Process (Vacuum Freezing Multiple Phase Transformation Process) described in U.S. Pat. No. 4,505,728, (b) the Distillative Freezing Process described in U.S. Pat. Nos. 4,378,984, 4,451,273 and 4,578,093 and (c) most freeze-drying processes. The part of the unit used to desublime or mix-condense the sub-triple point vapor and melt the resulting desublimate or solid phase is referred to as a "Sub-Triple Point Vapor Liquefier" or simply as a "Sub-T.P. Vapor Liquefier."

2. Brief Description of the Prior Art

The VFAPM Process is a vacuum freezing process that can be used in the separation of both aqueous and non-aqueous solutions. Many vacuum freezing processes have been introduced by workers in the desalination field. Some of these processes have been tested only in bench scale units and only a few have been tested in pilot plant scale operations. None of these processes has been commercialized and most of these have been considered abandoned. The processes introduced are as follows:

(1) Vacuum Freezing Vapor Compression (VFVC) Process developed by Colt Industries;

(2) Vacuum Freezing Vapor Absorption (VFVA) Process developed by the Carrier Corporation;

(3) Vacuum Freezing Ejector Absorption (VFEA) Process developed by Colt Industries;

(4) Absorption Freezing Vapor Compression (AFVC) Process Developed by Concentration Specialists, Inc.;

(5) Vacuum-Freezing Vapor-Freezing (VFVF) Process invented by Ralph E. Peck;

(6) Vacuum Freezing Multiple Phase Transformation (VFMPT) Process co-invented by Chen-Yen Cheng and Sing-Wang Cheng and under development by Calyxes R & D Corporation;

(7) Vacuum Freezing solid Condensation (VFSC) Process developed by the Catholic University of America;

(8) Vacuum Freezing High-Pressure Ice-Melting (VFPIM) Process introduced by Chen-Yen Cheng and Sing-Wang Cheng.

Referring to the processing of an aqueous solution by any vacuum freezing process, the aqueous solution is introduced into a chamber which is maintained at a pressure that is somewhat lower than the vapor pressure of the solution at the freezing temperature of the solution to thereby simultaneously flash vaporize water and form ice crystals. As the result of this operation, a low pressure water vapor, referred to as a first vapor, and an ice-mother liquor slurry, referred to as a first condensed mass, are formed. In the case of sea water desaltination, this pressure is around 3.5 Torr. The low pressure water vapor formed has to be removed and transformed into a condensed state; the ice crystals have to be separated from the mother liquor and the resulting purified ice has to be melted to yield fresh water. Furthermore, the heat released in transforming the vapor into a condensed state has to be utilized in supplying the heat needed in melting the ice. The processes described utilize different ways of vapor removal, different ways of transforming the vapor into condensed states and different ways of accomplishing the heat reuse.

A sub-triple point vapor is defined as a vapor whose pressure is lower than the triple point pressure of its major component. A subtriple point vapor desublimes to form a solvent solid upon a constant pressure cooling and the desublimation temperature is lower than the normal melting temperature of the solvent solid. When a sub-triple point vapor mixture is cooled, it may undergo a mixed condensation operation by partially condensing into liquid and partially condensing into solid at a temperature that is also lower than the melting temperature of the solvent solid. Therefore, the heat released in the desublimation operation or a mixed condensation operation of a subtriple point vapor or vapor mixture cannot be used in supplying the heat needed in melting a mass of the purified solid of the major component. Conversely, a super-triple point vapor is defined as a vapor whose pressure is higher than the triple point pressure of its major component. A super-triple point vapor condenses to form a solvent liquid upon a constant pressure cooling and the condensing temperature is higher than the normal melting temperature of the solvent solid. Therefore, the heat released in condensing a supertriple point vapor can be used in supplying the heat needed in melting a mass of the purified solid of the major component.

Vacuum freezing processes may be classified into Type A processes and Type B processes. In any Type A vacuum freezing process, a mass of sub-triple point vapor (also referred to as a first vapor) is formed in its vacuum freezing operation described, and a mass of super-triple point vapor (also referred to as a second vapor) is produced in an amount substantially equal to or more than that of the first vapor. The super-triple point vapor produced may be at a near triple point pressure or may be at a pressure substantially higher than the triple point pressure. In each of these processes, the second vapor is generated for one or both of the following purposes:

(a) to melt a mass of purified solvent solid and utilize the heat of condensation of the second vapor, or absorbing solution.

The VFVC, VFVA, VFEA, AFVC, VFVF and VFMPT Processes are Type A processes. However, in Type B vacuum freezing processes, a mass of super-triple point vapor is either not produced at all or the amount produced is only a small fraction of the amount of sub-triple point vapor generated. The VFSC Process and the VFPIM Process of the prior art and the VFAPM Process of the present application are Type B vacuum freezing processes.

The prior art processes are briefly reviewed in the following:

(1) The Vacuum Freezing Vapor Compression (VFVC) Process is a Type A process and is described in the Office of Saline Water, Research And Development Report 295. In this process, the low pressure water vapor (the first vapor) is compressed to a pressure higher than the triple point pressure of water (4.58 Torr) and is then brought in direct contact with purified ice to thereby simultaneously condense the water vapor and melt the ice. The main disadvantage of this process is that the special compressor designed to compress the low pressure water vapor cannot be operated reliably and the compressor efficiency is low. The super-triple point vapor produced is at a near triple point pressure and is used to melt the purified ice, thus reusing the heat of condensation.

(2) The Vacuum Freezing Vapor Absorption (VFVA) Process is also a Type A Process and was developed by the Carrier Corporation up to 1964, but the work has been discontinued. The process is described in the Office of Saline Water, Research and Development Report No. 113. In the process, the low pressure water vapor is absorbed by a concentrated lithium bromide solution. The diluted solution is reconcentrated by evaporation and the water vapor so formed is condensed to become fresh water. Heat of absorption is removed by a recycling water stream through a heat transfer surface; the recycling water stream is then used to melt the ice crystals. In this process, the super-triple point vapor is produced in the course of concentrating the weak absorbing solution and is produced at such a high pressure that it can be condensed by sea water in the condenser.

(3) The Vacuum Freezing Ejector Absorption (VFEA) Process is also a Type A process developed by Colt Industries and is described in the Office of Saline Water, Research and Development Report No. 744. In the process, the low pressure water vapor obtained in the freezing step is compressed by a combination of stem ejector and absorber loop. A concentrated sodium hydroxide solution is used to absorb a part of the low pressure vapor, the diluted sodium hydroxide solution is boiled to form water vapor at 300 Torr and regenerate the concentrated solution. In the ejector, the water vapor at 300 Torr is used to compress the remaining low pressure water vapor to produce a super-triple point vapor. The super-triple point vapor produced is at a near triple point pressure and is used to melt purified ice and reuse the heat of condensation.

(4) The Absorption Freezing Vapor Compression (AFVC) Process is also a Type A process, introduced by Concentration Specialists, Inc., Andover, Mass., and a 25,000 gpd pilot plant has been built at the OWRT (Office of Water Research and Technology) Wrightsville Beach Test Station. The Absorption Freezing Vapor Compression (AFVC) Process is a vacuum freezing process in which the freezing is accomplished in a stirred tank crystallizer due to the evaporation of water vapor which in turn is absorbed in an adjacent chamber by a concentrated solution of sodium chloride (NaCl). The NaCl solution, diluted by the water vapor, is pumped to a generator where it is concentrated to its original strength by a vapor compression cycle using a closed circuit refrigerant as the working fluid. The vapor compression cycle operates between the absorber and generator, taking the heat that is associated with absorption and pumping it up to a level such that it can be used to evaporate the absorbate in the generator. The vapor liberated in the generator is a supertriple point vapor which is used to melt the ice in direct contact. It is noted that the super-triple point vapor is produced at a near triple point pressure in the course of concentrating the weak absorbing solution and is used to melt the purified ice and reuse the heat of condensation.

(5) The Vacuum Freezing Vapor Freezing (VFVF) Process is also a Type A process that was introduced by Ralph E. Peck of the Illinois Institute of Technology and is described in U.S. Pat. No. 3,714,791. In the patent, a batch evaporative desalination method and apparatus having a pair of similar systems for substantially continuous output is described. Each system has three evacuated chambers in vapor communication with each other. In the first chambers, precooled seawater is sprayed for partial vaporization and consequent formation of ice crystals as latent heat is removed from the seawater. Ice crystals are permitted to accumulate in the first chamber and water vapor flows to a second chamber in which refrigeration coils, preferably cooled by cold natural gas, are maintained at a temperature below the triple point so that ice condenses thereon. After a selected interval, spraying of precooled seawater into the first chamber and refrigeration in the second chamber are stopped. Warmer seawater is then sprayed into a third chamber also maintained at low pressure so that a portion of the water vaporizes but without formation of ice in the brine. The water vapor flows to the first and second chambers and condenses on the ice therein to transfer latent heat for melting the ice. Fresh water is withdrawn from the second chamber. Fresh water in the first chamber percolates through the ice crystals for washing and when residual brine is removed, fresh water is withdrawn from this chamber also. In this process, the super-triple point vapor is produced at a near triple point pressure and is used to melt the ice in the first and second chambers and reuse the heat of condensation.

(6) The Vacuum Freezing Multiple Phase Transformation (VFMPT) Process is also a Type A process and is described in U.S. Pat. No. 4,505,728. In the process, a feed containing a volatile solvent and one or more non-volatile solutes is separated to produce a purified solvent product and a concentrate by the following steps: (a) a feed is flash vaporized in a vacuum freezing zone to form a first vapor and a first condensed mass containing solvent crystals and mother liquor, the pressure of the first vapor being lower than the triple point pressure of the solvent; (b) the first condensed mass is separated into a mass of purified solvent crystals and a concentrate in a crystal washing unit; (c) the first vapor is brought to a liquid state in a vapor liquefaction zone comprising several sub-zones by a two-stage transformation involving vapor desublimation and desublimate melting operations; (d) a solvent stream is continuously vaporized in a thin film evaporator within a vapor generation zone to produce a continuous stream of second vapor whose pressure is somewhat higher than the triple point pressure of the solvent; (e) the solvent vapor is brought in contact with the purified solvent crystals to thereby melt the crystals and condense the vapor. The desublimate melting operation may also be accomplished by bringing a part of the second vapor in contact with the desublimate. A unique set of valving means are used to control the flows of the first and second vapors to the vapor liquefaction sub-zones. In this process, the super-triple point vapor is formed at a near triple point and is used to melt the purified solvent crystals and the desublimate.

(7) The Vacuum-Freezing Solid-Condensation (VFSC) Process is a Type B process developed by Professors H. M. Curran and C. P. Howard of the Catholic University of America and is described in the Office of Saline Water, Research and Development Report No. 511. The process is a batch evaporative freezing process in which saline water is sprayed into rotating cylindrical basket at a pressure below the triple point pressure. Continuous removal of vapor results in the formation of an annular ice-brine semi-solid layer on the lateral surface of the basket. The brine is removed by washing and the residual ice is melted. The optimum design requires that the freezing, washing and melting operations be of equal duration. Therefore, the optimum plant consists of three modules, in each of which the freezing, washing and melting operations occur in succession and out-of-phase with the other two. The heat removed by evaporative freezing in one module is used to melt the washed ice in another module. The main mass of washed ice crystals is melted by being brought into contact with the heated surface. In this process, a super-triple point vapor is either not produced at all or is only produced in a small amount.

(8) The Vacuum Freezing High-Pressure Ice-Melting (VFPIM) Process, also a Type B process, is described in U.S. Pat. No. 4,236,382. In the process, an aqueous solution is flash vaporized under a reduced pressure to simultaneously form a sub-triple point water vapor and ice crystals. The ice formed is first purified in a counter-washer and then melted inside of heat conductive conduits under a pressure (e.g. 600 atm.) and the sub-triple point vapor is desublimed to form desublimate (ice) on the outside of the conduits. The latent heat of desublimation released is utilized in supplying the heat needed in the ice-melting operation. The desublimate is removed intermittently by an in-situ dissolution operation utilizing an aqueous solution such as the feed solution or the concentrate; about an equivalent amount of ice is formed inside of the conduits by an exchange freezing operation. The ice so formed is also melted by the high-pressure ice-melting operation described. It is noted that a super-triple point vapor is not produced in this process.

The Distillative Freezing Process described in U.S. Pat. Nos. 4,218,893, 4,378,984 and 4,578,093, is useful in separating a mixture containing at least two volatile components, denoted respectively as A-component and B-component, by simultaneously vaporizing the two components from the mixture under a sufficiently reduced pressure to simultaneously crystallize B-component. The vapor mixture obtained is a sub-triple point vapor mixture and is brought to a condensed state either by a simple condensation to form a liquid mass or a mixed condensation operation to form a condensed mass containing a solid mass and a liquid mass without being substantially pressurized. The process may be conducted to completely eliminate the liquid phase and bring the mixture into the two phase solid-vapor region. Then the solid phase is no longer contaminated by the adhering liquid phase and gives a high purity B-component liquid upon melting. The process is particularly useful in separating mixture containing close boiling components, such as styrene-ethyl benzene mixtures and p-xylene and m-xylene mixtures.

The Sub-Triple Point Vapor Processing Unit contains a two-stage sub-triple point vapor liquefier and can be used in the VFAPM Process, the VFMPT Process, the Distillative Freezing Process, the freeze-drying processes and other processes in which sub-triple point vapors are produced and are to be brought to liquid states.

BRIEF DESCRIPTION OF THE INVENTION

A new vacuum freezing separation process and a new apparatus for generating a sub-triple point vapor and liquefying the vapor have been introduced. The process is entitled, "Vacuum Freezing Ambient Pressure Melting (VFAPM) Process" and the apparatus is entitled, "SubTriple Point Vapor Processing Unit" or simply, "Sub-T.P. Vapor Processing Unit." Each Sub-T.P. Vapor Processing Unit is comprised of a two-stage sub-triple point vapor liquefier. A plant of the VFAPM Process can be constructed at a low cost and can be operated reliably and most of the processing steps can be operated continuously. The VFAPM Process can be used in separating the solvent from an aqueous solution or a non-aqueous solution containing one or more low volatility solutes. Examples are: desalination of sea water and brackish water, concentration of industrial aqueous solutions such as salt solutions, caustic solutions and acid solutions; concentration of juices such as sugar, orange, apple and tomato juices; separation of solvents from organic solutions such as those obtained in extraction processes; water pollution abatement and water reuse. The process can also be used in conditioning a mixture by freezing and thawing operations such as in conditioning an aqueous sludge to facilitate dewatering the sludge. The Sub-T.P. Vapor Processing Unit can be used in vacuum freezing processes such as the VFAPM Process and the VFMPT Process, in the Distillative Freezing Process, in freeze-drying processes and other processes in which sub-triple point vapors are produced.

The VFAPM Process is conducted in two processing zones, a vacuum processing zone and an ambient pressure processing zone. In most applications, the VFAPM Process comprises the following four steps:

(a) Simultaneous flash vaporization and crystallization to form a first vapor which is a sub-triple point vapor and a mass of solvent crystals, the pressure of the first vapor being lower than the triple point pressure and the crystals and the remaining liquid forming a slush denoted as a first condensed mass (Step 1);

(b) Two-stage liquefaction of the first vapor by first desubliming the first vapor without pressurization to form a mass of desublimate (Step 2a) and then melting the desublimate (Step 2b);

(c) Separating the first condensed mass into a mass of purified solvent solid and a mother liquor (Step 3);

(d) Melting the mass of purified solvent solid obtained in Step 3 (Step 4).

It is normally preferred to process the said Steps 1, 2a and 2b in the vacuum processing zone and process both the said Step 3 and Step 4 in the near ambient pressure processing zone. The desublimate may be melted (Step 2b) by various ways of heating. However, it is advantageous to generate a small amount of second vapor which is a super-triple point vapor at a near triple point pressure by use of a thin film evaporator and bring the second vapor in direct contact with the desublimate to thereby simultaneously condense the second vapor and melt the desublimate. The melts of the desublimate and the solvent crystals and the condensate of the second vapor are purified solvent. Desublimation of the first vapor (Step 2a) and melting of the desublimate (Step 2b) are collectively referred to as a two-stage transformation of the first vapor or simply as a two-stage liquefaction of the first vapor (Step 2). It is noted, however, that one may also conduct the crystal purification step (Step 3) in the vacuum processing zone and conduct only the crystal melting step (Step 4) in the near ambient pressure processing zone. It is also noted that when the VFAPM Process is used in conditioning aqueous and non-aqueous gels such as gelatin and waste water sludge, the said crystal purification step (Step 3) is not needed. When a second vapor is used in melting the desublimate, the ratio of the mass of the second vapor to the mass of the firs vapor is about equal to the ratio of the latent heat of melting per unit mass to the latent heat of condensation per unit mass. In an aqueous system, this ratio is about one-seventh. Since a super-triple point vapor is either not produced at all or is produced in an amount that is much less than the amount of the sub-triple point vapor (the first vapor) generated, the VFAPM Process is a Type B process. In the VFAPM Process, a refrigerant liquid is vaporized to remove the latent heat released in the desublimation of the first vapor by an indirect contact heat transfer operation and the resulting refrigerant vapor is compressed and condensed to supply the latent heat of melting the solvent solid and also supply the latent heat of generating the second vapor, both by indirect contact heat transfer operations.

It has been described that a VFAPM plant has a vacuum processing zone and an ambient pressure processing zone. One or more sub-triple point vapor generator-liquefiers (denoted as Sub-T.P. Vapor Processing Units) may be placed in the vacuum processing zone and one crystal washer-melter may be installed in the ambient pressure processing zone. It is noted that, for a large capacity VFAPM plant, it is advantageous to use several Sub-T.P. Vapor Processing Units and the first condensed masses produced in these units are combined and processed in a large crystal washer-melter unit.

A Sub-T.P. Vapor Processing Unit has a first vapor generating zone, a first vapor liquefaction zone and may also have a second vapor generation zone. It may be used in a vacuum freezing process such as the VFAPM Process or the VFMPT Process, the Distillative Freezing Process, a freeze-drying process and other processes in which sub-triple point vapors are generated. A first vapor generated is a sub-triple point vapor and is liquefied by a two-stage transformation comprising a desublimation operation and a desublimate melting operation in the liquefaction zone. The desublimate may be melted by a conventional way of heating. However, it is advantageous to generate a small amount of a super-triple point vapor (second vapor) at a near triple point pressure and bring the second vapor in contact with the desublimate to thereby melt the desublimate and condense the second vapor.

When used in a vacuum freezing process, a first vapor is generated in the generation zone by a vacuum freezing operation from a liquid solution; when used in the Distillative Freezing Process, a first vapor is generated in a distillative freezing operation; when used in a freeze-drying process, a first vapor is generated by a sublimation operation from a frozen matter. In the second vapor generation zone, there is a thin film evaporator heated by a condensing refrigerant vapor for generating a super-triple point vapor. It is found advantageous to use plate-type heat exchange elements for the thin film evaporator. Such exchanger plates are available from the Rosenblad Corporation in Princeton, N.J., the Mueller Company in Springfield, Mo., and the Tranter Corporation in Wichita Falls, Tex.

There is a first vapor liquefying unit in the liquefaction zone. The liquefying unit has a rectangular container that is partitioned into several vertical vapor liquefaction compartments. There are a heat exchanger, one or more first valving means for controlling the flow of the first vapor, one or more second valving means for controlling the flow of the second vapor, a refrigerant liquid valve and a refrigerant vapor for each compartment, and a partition for isolating the first and second vapors. The rectangular container has a top plate. First and second valving means for admitting and controlling the flows of first and second vapors to the compartments are provided on the top plate. First vapor and second vapor are alternately admitted and a refrigerant liquid is admitted to the heat exchanger in each compartment intermittently to carry out the desublimation and desublimate melting operations. Operations in the compartments are properly staggered so that the first vapor generation and second vapor generation operations can be conducted at least substantially continuously. Again, it has been found advantageous to use the plate-type heat exchange elements in each compartment.

In the VFAPM Process, a slush containing solvent crystals and mother liquor is formed in a vacuum freezing operation. The crystals in the slush are purified and melted in a crystal washing unit and a crystal melting unit. It is advantageous to conduct both the washing and melting operations under near ambient pressures. However, one may also choose to conduct the washing operation under vacuum and conduct only the melting operation under a near ambient pressure. Various designs of crystal washers and melters are described. It has been found advantageous to use the plate-type heat exchange elements described earlier to transfer heat in the crystal melter.

It has been described that a VFAPM plant has a vacuum processing zone and a near ambient pressure processing zone. In a small plant, one may use one Sub-T.P. Vapor Processing Unit in the former zone and use a crystal washer and crystal melter in the latter zone. In a large plant, however, it is advantageous to use several Sub-T.P. Vapor Processing Units in the former zone and the first condensed masses produced in these units are combined and the combined stream is processed in one crystal washer and one crystal melter.

BRIEF DESCRIPTION OF THE DRAWINGS

FIG. 1 illustrates the flow sheet of the VFAPM Process. It shows that a vacuum freezing operation, desublimation of the first vapor and melting of the desublimate are conducted in a vacuum processing zone and the first condensed mass formed is transported from the vacuum processing zone to a near ambient pressure zone, wherein the mass of solvent crystals is purified and melted. It also shows that a small amount of second vapor may be generated and used in melting the desublimate. A refrigerant is circulated to remove heat of desublimation of the first vapor and supply heat of melting the mass of solvent crystals and heat of vaporization in forming the second vapor. It is noted that one may choose to conduct the crystal washing step under vacuum and conduct only the crystal melting step under a near ambient pressure.

FIG. 2a illustrates the operating conditions of processing an aqueous solution by referring to a phase diagram; FIG. 2b illustrates similar operating conditions for processing a non-aqueous solution.

FIG. 3 illustrates a phase diagram of a binary mixture which can be separated and purified by the Distillative Freezing Process. This figure is used to describe how a sub-triple point vapor mixture is generated from a mixture and how the sub-triple point vapor is transformed into a liquid mass by a two-stage liquefaction operation conducted in a sub-triple point vapor processing unit.

Two types of Sub-T.P. Vapor Processing Units are described. In each unit, there are a first vapor generating zone (first zone), a first vapor liquefaction zone (second zone) and a second vapor generation zone (third zone) and these zones are disposed in a longitudinal vacuum chamber. In a Type 1 unit, the first and second zones are disposed along the longitudinal direction; in a Type 2 unit, the first and second zone are disposed side-by-side along the longitudinal direction.

FIGS. 4a and 4b respectively illustrate a horizontal cross-section and a vertical cross-section of a Type 1 Sub-T.P. Vapor Processing Unit. There are a vacuum freezing zone (first zone), a first vapor liquefaction zone (second zone), a second vapor generation zone (third zone), a set of first valves, a set of second valves, a set of refrigerant liquid valves and a set of refrigerant vapor valves in the unit. It is seen that the vacuum freezing zone is compartmentalized and there is a vacuum freezer in each compartment for distributing the solution being processed. It is seen that there is a first vapor liquefier in the second zone and the liquefier is also compartmentalized. Each compartment is provided with a plate heat exchanger, a first valve and a second valve for controlling the flows of the first and second vapors and a set of valves for controlling the flows of refrigerant liquid and vapor. It has been found advantageous to use plate-type heat exchange elements such as Temp-plates made by the Mueller Company in Springfield, Mo., Rosco plates made by the Rosenblad Corporation in Princeton, N.J., and the Econo-coil and Plate coil made by the Tranter Corporation in Wichita Falls, Tex., for the heat exchangers.

Figure 5A:
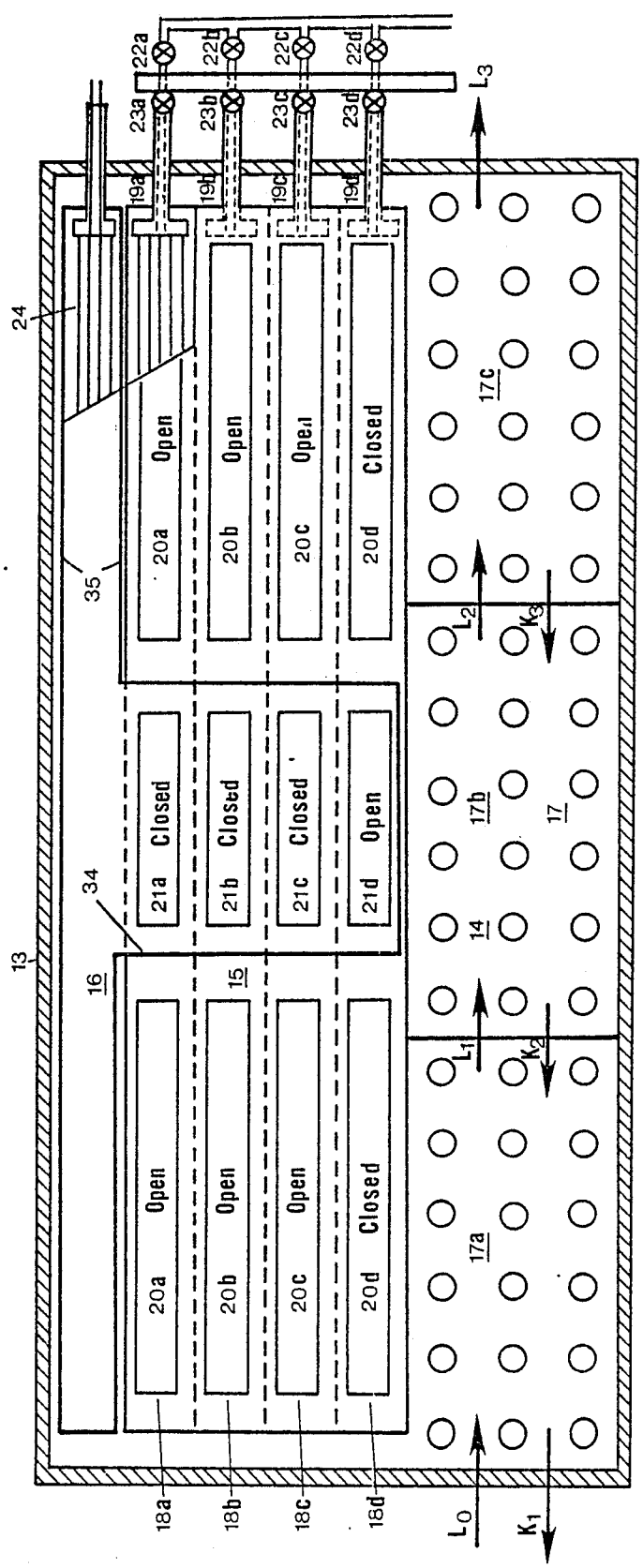
Figure 5E:
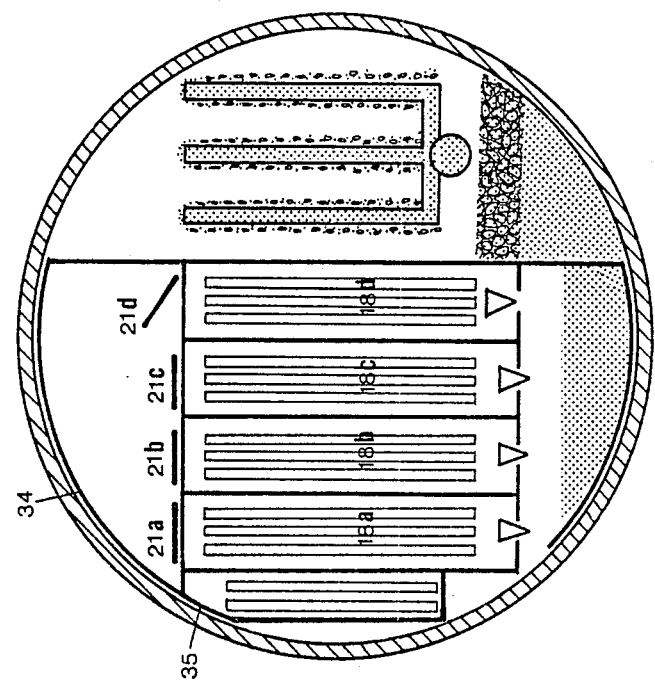
Figure 5D:
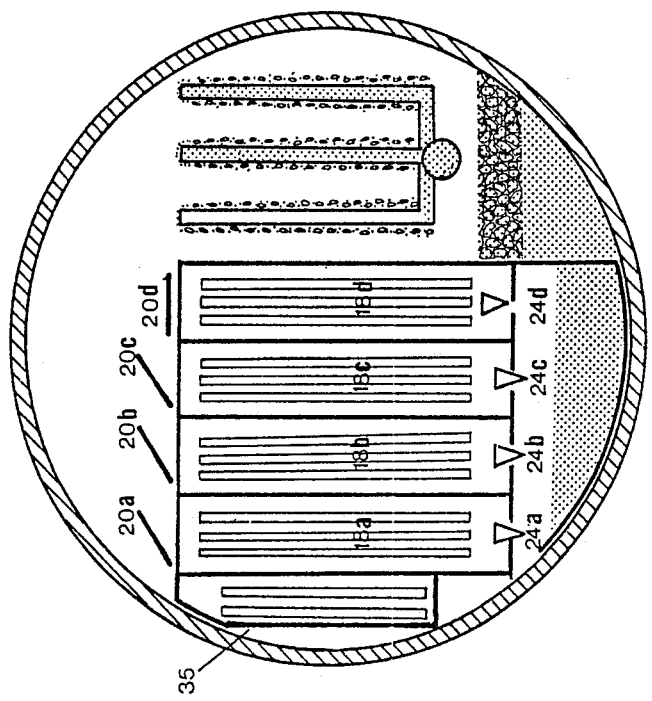

FIG. 5a illustrates a horizontal cross-section of a Type 2 Sub-T.P. Vapor Processing Unit. In this unit, the first zone, the second zone and the third zone are disposed side-by-side along the longitudinal direction. The first zone is the vacuum freezing zone. There is a first vapor liquid unit in the second zone and the liquefier unit is provided with two sets of first valves for controlling the flow of the first vapor and one set of second valves for controlling the flow of the second vapor. FIG. 5b illustrates a vertical cross-section taken along the first zone. FIG. 5c illustrates a vertical cross-section taken along the second zone. A heat exchanger made of plate-type exchange elements is shown in the second zone. FIG. 5d illustrates a vertical cross-section taken in the radial direction taken at a first valve position. FIG. 5e illustrates a vertical cross-section taken in the radial direction at a second valve position. Referring to the figures, it is seen that the first vapor liquefier is compartmentalized into four compartments. Each compartment is provided with two first valves and one second valve. The first valves in three compartments are open to admit first vapor into the compartments while the second valve of the remaining compartment is open to admit second vapor into the compartment during a normal cycle.

Figure 6:
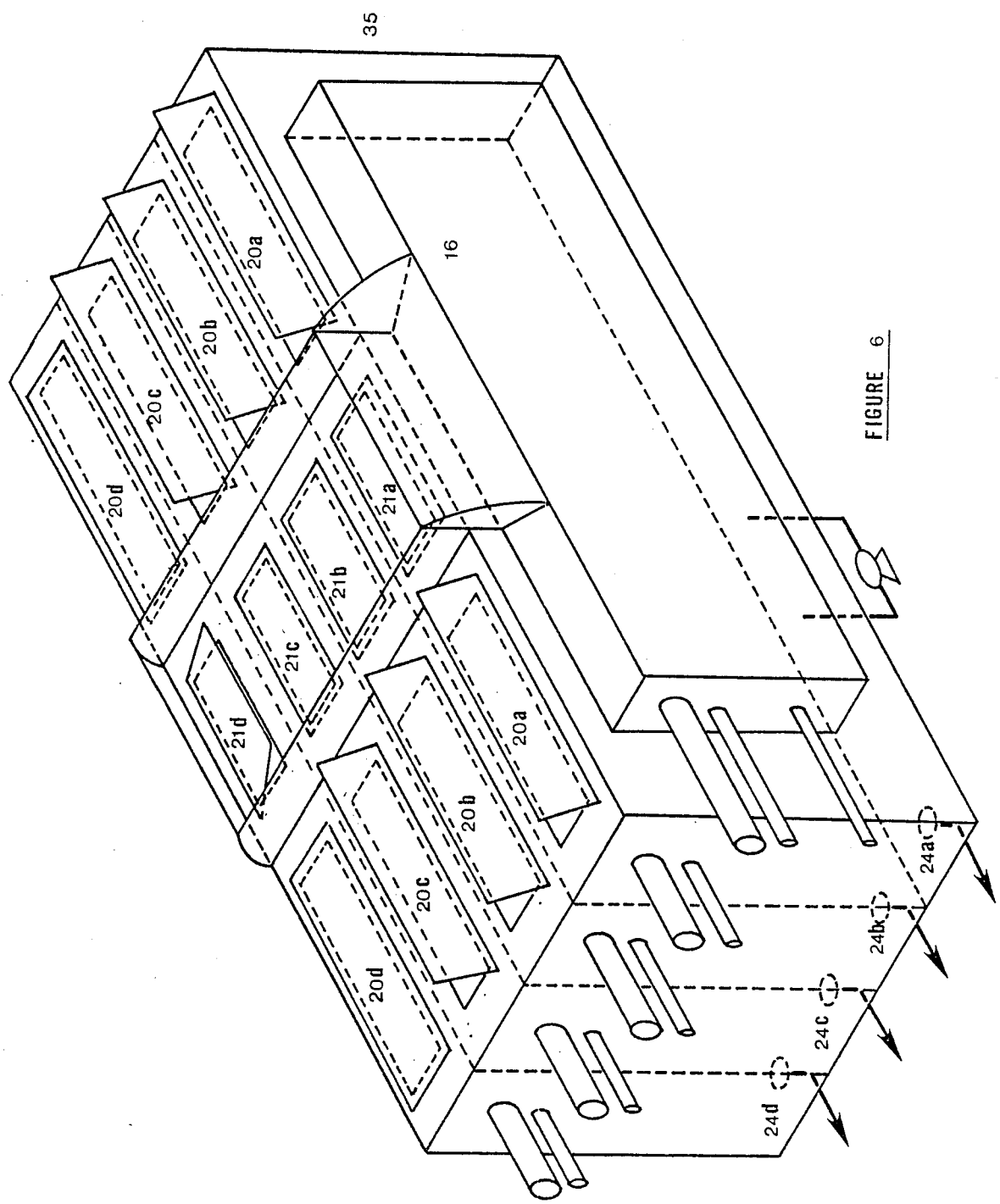

FIG. 6 illustrates an isometric drawing of a major part of a Sub-T.P. Vapor Processing Unit having a first vapor liquefier and a second vapor generator.

Figure 7:
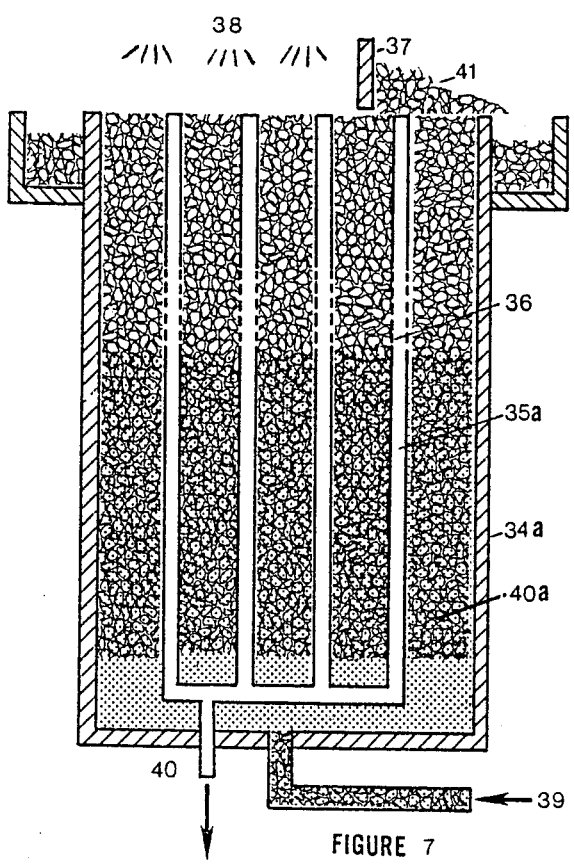

FIG. 7 illustrates a crystal washer that is operable under a near ambient pressure.

Figure 8:
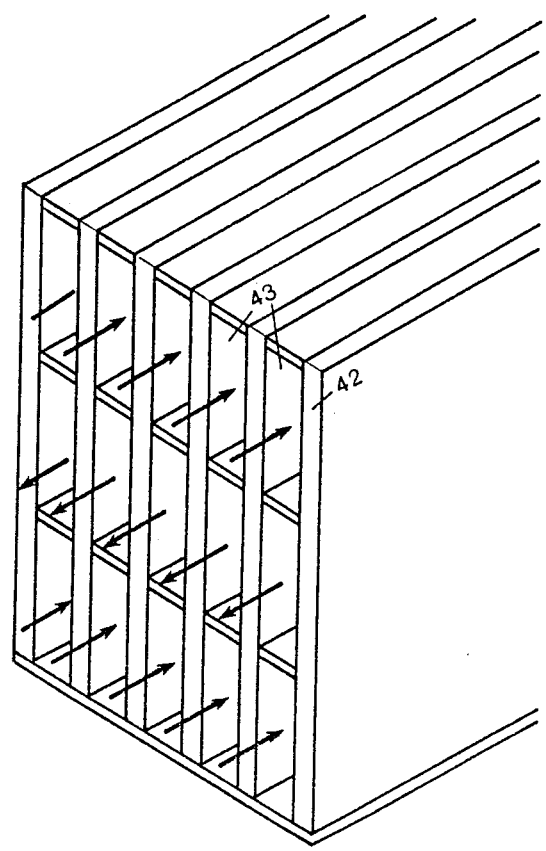

FIG. 8 illustrates a near ambient pressure crystal melter in which a slush containing solvent crystals and solvent liquid is circulated.

Figure 9:
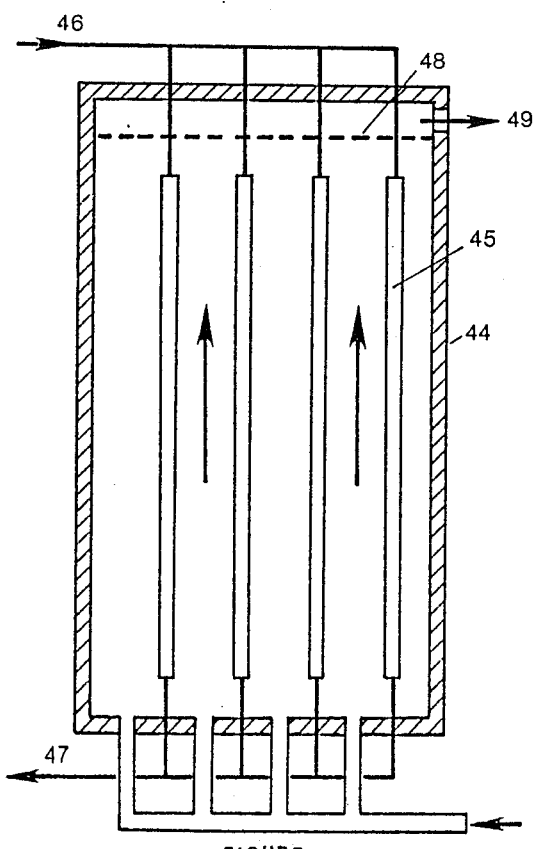

FIG. 9 illustrates a packed-bed near ambient pressure crystal melter in which a slush containing solvent crystals and solvent liquid is introduced at the bottom and the melt is removed through a screen at the top.

Figure 10:
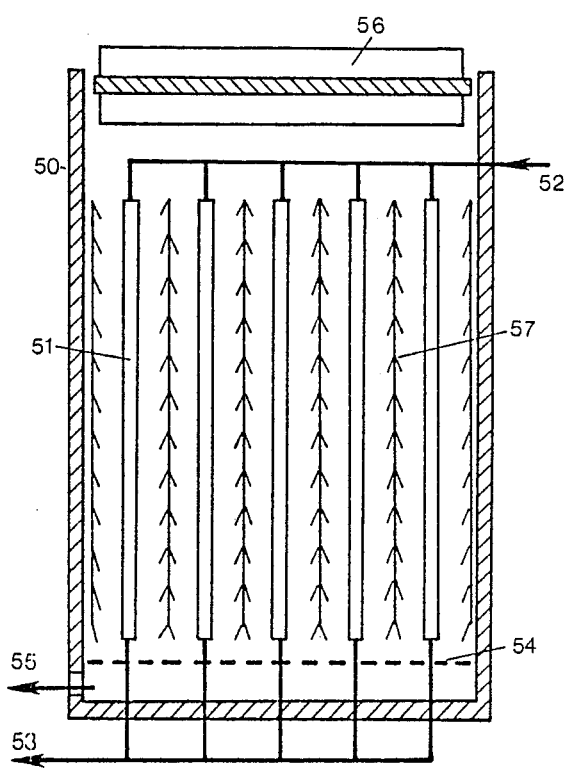

FIG. 10 illustrates another near ambient pressure crystal melter in which a slush containing solvent crystals and solvent liquid is introduced at the top and the melt is removed through a screen at the bottom.

FIG. 11 illustrates a vertical integrated unit containing a crystal washer and a crystal melter. The crystal melter is placed above the crystal washer.

FIG. 12 illustrates another integrated unit containing a crystal washer and a crystal melter. The crystal washer and the crystal melter are placed side-by-side along the longitudinal direction.

FIG. 13 illustrates the lay-out of a larger VFAPM plant. It shows that in a large plant, it is advantageous to use several Sub-T.P. Vapor Processing Units and one large crystal washer-melter. The masses of slush formed in the Sub-T.P. Vapor Processing Units are fed into the single crystal washer-melter. Plant cost can be greatly reduced by this arrangement.

DESCRIPTION OF PREFERRED EMBODIMENT OF THE INVENTION

There are two types of applications for the VFAPM Process. Type 1 processes are used in the separation of mixtures such as in desalination of sea water and brackish water; concentrations of industrial solutions such as sugar solutions, caustic solutions and acid solutions; separations of organic solutions such as those obtained in extraction processes. Type 2 processes are used in the conditioning of mixtures by freezing and thawing operations, such as in the conditioning of gels and sludges to facilitate dewatering. In a Type 1 process, there is a step of separating the first condensed mass into purified solvent crystals and mother liquor (i.e. concentrate); in a Type 2 process, the step described is omitted. A preferred way of conducting a Type 1 process is illustrated by FIG. 1. It shows that the process is carried out in a vacuum processing zone and a near ambient pressure zone and comprises the following steps:

Step 1: Vacuum Freezing

A feed mixture is flash vaporized under a reduced pressure to simultaneously form solvent crystals. The feed mixture is thereby transformed into a first vapor and a first condensed mass that contains the solvent crystals and remaining liquid. Since the pressure of the first vapor is lower than the triple point pressure of the solvent, it is a sub-triple point vapor.

Step 2: Two-Stage First Vapor Liquefaction

The first vapor formed in Step 1 is transformed into a mass of solvent liquid by a two-stage transformation, Steps 2A and 2B, as follows. This step is also conducted in the vacuum processing zone.

Step 2A: First Vapor Desublimation

The first vapor formed in Step 1 is cooled without a substantial pressurization by passing a cooling medium through a heat exchanger. Since the vapor is substantially pure solvent and since the pressure is lower than the triple point pressure of the solvent, at least a major part of it desublimes to form a mass of desublimate on the heat exchanger surface.

Step 2B: Desublimate Melting

The desublimate formed on the heat exchanger surface in Step 2A may either be melted in-situ or be scraped off and melted. One way to accomplish the in-situ melting operation is to pass a heating medium through the heat exchanger. Another way is to bring a mass of second vapor which is a super-triple point vapor at a pressure near the triple point pressure in contact with the desublimate to thereby melt the desublimate and condense the second vapor. These two sub-steps are also conducted in the vacuum processing zone. When the desublimate is scraped off of the heat exchanger surface, it may be melted with the solvent crystals from Step 3 in the crystal melting step (Step 4) to be described.

Step 3: Crystal Washing

The first condensed mass obtained in Step 1 is separated and washed to give a mass of purified solvent crystals and a mother liquor. The mother liquor is heat exchanged and becomes a product (concentrate). It is preferrable to conduct this crystal washing step under a near ambient pressure. However, it is also possible to conduct this step under vacuum.

Step 4: Crystal Melting

The mass of purified solvent crystals obtained in Step 3 is melted under a near ambient pressure.
A refrigeration loop is incorporated in the system to remove heat in the first vapor desublimation step, and the heat is upgraded to supply the heat needed in the crystal melting step. There is a purified solvent product and a concentrate. These two streams are heat exchanged with the feed and are discharged from the system. Due to incomplete heat exchange operations, work input to the system and heat leakage into the system, there is a need for auxiliary refrigeration. This auxiliary refrigeration sub-system is not shown in the figure.

The desublimate melting operation may be conducted by bringing a mass of second vapor in direct contact with the desublimate. Then the second vapor condenses on the outer surface of the desublimate and melts the desublimate from the outer surface inward, while the remaining desublimate is held on the heat exchanger surface. Under this mode of operation, the process has the following additional step:

Step 5: Second Vapor Generation

A mass of solvent liquid is vaporized at a temperature somewhat higher than the triple point temperature of the solvent to generate a second vapor whose pressure is somewhat higher than the triple point pressure of the solvent. A thin film evaporator may be used for this vapor generation operation. In processing an aqueous solution, the pressure of the second vapor is around 4.6 to 5.5 torr, which is slightly higher than the triple point pressure of water, 4.58 torr. The second vapor is a super-triple point vapor.

An improvement may be introduced to the vacuum freezing operation. This improved operation may be referred to as the hybrid countercurrent multi-stage vacuum freezing operation. This improved operation is described in detail by referring to FIGS. 4a and 5a. When this improved operation is adopted in the process, the concentrated brine is discharged from the vacuum freezing zone, and the first condensed mass contains ice crystals and a brine that is nearly of the feed composition. The brine separated in the crystal washing column is recycled to the vacuum freezer.

In a Type 2 process, Step 3 described is omitted and the first condensed mass produced in Step 1 is transported directly from the vacuum freezing zone to the crystal melter.

In order to clearly distinguish the VFAPM Process from the other existing vacuum freezing processes, it is useful to characterize each process by a parameter called "Vapor Mass Ratio" which is defined as follows:

$$\text{Vapor Mass Ratio} = \frac{\text{Mass of Super-Triple Point Vapor Produced}}{\text{Mass of Sub-Triple Point Vapor Produced}}$$

A sub-triple point vapor is a vapor whose pressure is lower than the triple point pressure of the major component. The first vapor formed in a vacuum freezing step is a sub-triple point vapor. A super-triple point vapor is a vapor whose pressure is higher than the triple point pressure of the major component. In a vacuum freezing process, a super-triple point vapor is produced for one or both of the following purposes:

(a) to melt the mass of purified solvent crystals and/or the desublimate, and/or (b) to concentrate absorbing solution after an absorption operation back to its original concentration.

Most of the existing vacuum freezing process have their vapor mass ratios substantially equal to one or greater than one. These processes are referred to as Type A processes. As has been described, the VFVC, VFVA, VFEA, AFVC, VFVF and VFMPT Processes are Type A processes. A process whose vapor mass ratio is much less than one is referred to as a Type B process. Only the VFSC and VFPIM Processes in the prior art are Type B processes. In both processes, the ratios are substantially equal to zero. When second vapor is not used in melting the desublimate, the vapor mass ratio of the VFAPM Process is also equal to zero. When second vapor is used in the desublimate melting operation, the vapor mass ratio in the VFAPM Process is still a small value that is approximately equal to the ratio of latent heat of melting and the latent heat of condensation of the solvent. In the case of processing an aqueous mixture, this ratio is about 144/1000=0.144. Therefore, the VFAPM Process is a Type B process. Since neither one of the VFSC and VFPIM Processes are being actively developed, the VFAPM Process is the only Type B process being actively developed for commercialization at the time.

The operating conditions for the steps described are explained by referring to the phase diagrams illustrated by FIGS. 2a and 2b. FIG. 2 illustrates the phase behaviors of water and an aqueous solution. It shows the triple point of water 1 (0.01 deg. C., 4.58 torr.), vaporization line 1-2, melting line 1-3 and sublimation line 1-4. The vapor pressure line of an aqueous solution containing one or more non-volatile solues is shown by lien 5-6. The three phase point representing the condition under which three phases, ice, water vapor and the aqueous solution, co-exist and attain equilibrium is shown as point 5. Let the concentration of the solution in the freezer be such that its vapor pressure curve be represented by line 5-6, then the first vapor leaving the vacuum freezing zone is at a pressure somewhat lower than the pressure at the three phase point 5. This vapor then enters one or more vapor desublimation sub-zones and is cooled and becomes desublimate on the heat exchanger surfaces at a pressure 7 which is lower than that of the three phase pressure 5. The desublimate may be melted by a conventional heating operation. A convenient way is to generate and use a mass of second vapor in melting the desublimate. When this approach is used, a mass of solvent liquid is vaporized to form the second vapor 8 whose pressure is slightly higher than the triple point pressure 1 of the solvent. The melting temperature of the desublimate is represented by point 9. When the second vapor is brought in contact with the desublimate, heat transfer takes place from the vapor to the desublimate so that condensation of the vapor and melting of the desublimate take place simultaneously. Line 11-12 shows the vaporization curve of the refrigerant used in a VFAPM plant. It shows that the refrigerant liquid is vaporized under a low pressure and low temperature 11 to remove the latent heat release in the desublimation operation 7 and is condensed under a high pressure and high temperature 12 to supply the heat needed in melting the purified mass of solvent crystals and the heat needed in generating the second vapor. FIG. 2b illustrates the phase behaviors of a non-aqueous solvent and a solution of the solvent and one or more low volatility solutes. The operational steps used in separating a non-aqueous solution are similar to those described for the aqueous solution. Therefore, a description of them is omitted.

Since a sub-triple point vapor processing unit of the present disclosure can be used in the Distillative Freezing Process, a brief description of the process is made by referring to FIG. 3.

The Distillative Freezing Process applies to a liquid feed containing a volatile and crystallizing component, denoted as B-component, and one or more volatile and non-crystallizing components, denoted respectively as $A_1$, $A_2$–$A_3$ components. Two components of the mixture processed are chosen and denoted as the key components; one is the crystallizing component and is denoted as B-component; the other is the non-crystallizing component present in the greatest amount and is denoted as A-component. For a mixture to be processable by the Distillative Freezing Process, the mixture has to have certain characteristic phase behaviors and the vapor pressures of the key components have to meet some limitations. The required phase behaviors and vapor pressure relations are described by referring to binary systems, each having a crystallizing component and one non-crystallizing component. In the Distillative Freezing Process, a liquid feed is flash vaporized under a sufficiently reduced pressure to simultaneously crystallize the B-component and the process may be continued to completely eliminate the liquid phase and bring the mixture into the two-phase solid vapor region. Then, the solid phase is no longer contaminated by an adhering liquid phase and gives a super-pure product of the B-component upon melting.

In order for the process to work, the ratio of the vapor pressures of the non-crystallizing key component and crystallizing component has to be within a proper range and the low pressure phase diagram of the system has to have certain characteristic features. These features are explained by referring to phase diagrams of binary systems to which the process can be applied. FIG. 3 illustrates a low pressure phase diagram of a system in which the volatility of the crystallizing component ($\alpha_B$) is higher than that of the non-crystallizing key component ($\alpha_A$). The characteristic features are that there is a three-phase (B-solid, liquid, vapor) temperature $1a$-$2a$-$3a$ (denoted as B-L-V temperature), and there are a two-phase (B-solid, vapor) region $1a$-$3a$-$4a$ (denoted as B-V region) and a two-phase (B-solid, liquid) region $1a$-$2a$-$5a$-$6a$ (denoted as B-L region) above and below the three-phase B-L-V temperature respectively. It is noted that liquid-vapor regions $2a$-$3a$-$7a$ are above the B-L-V temperature in this system.

When a mixture is subjected to a distillative freezing operation conducted under a pressure that is lower than the triple point pressure of the crystallizing component, a sub-triple point vapor $3a$ (denoted as a first vapor) and a first condensed mass which may be a pure solid of the crystallizing component or a solid-liquid mixture is formed. When the first vapor is cooled without a substantial pressurization $8a$, it undergoes a mixed condensation operation to form a mass of B-crystals $9a$ and a mass of liquid mixture $10a$. The solid may adhere to the cooling surface. A Sub-Triple Point Vapor Processing Unit may be used in a distillative freezing process in a way similar to that used in the VFAPM Process.

An integrated unit entitled, "Sub-Triple Point Vapor Processing Unit" or simply "Sub-T.P. Vapor Processing Unit" is used in the vacuum processing zone of a VFAPM plant illustrated in FIG. 1. Two types of Sub-T.P. Vapor Processing Units are described. Each unit has a longitudinal vacuum vessel in which there are a first vapor generation zone (first zone), a first vapor liquefaction zone (second zone) and a second vapor generation zone (third zone). In a Type 1 unit, the first and second zone are disposed along the longitudinal direction; in a Type 2 unit, the first and second zones are disposed in a side-by-side arrangement along the longitudinal direction. The Type 1 and Type 2 arrangements are respectively preferred in constructing relatively small units and relatively large units.

FIGS. 4a and 4b respectively illustrate a horizontal cross-section and a vertical cross-section of a Type 1 Sub-T.P. Vapor Processing Unit. There is a vacuum chamber 13 enclosing a first vapor generation zone (first zone) 14, a first vapor liquefaction zone (second zone) 15 and a second vapor generating zone (third zone) 16. When a Sub-T.P. Vapor Processing Unit is used in a vacuum freezing process, the first zone becomes the vacuum freezing zone and a vacuum freezer is installed in the zone. Various types of vacuum freezers developed by earlier workers or newly developed freezers can be used. The vacuum freezer 17 illustrated is compartmentalized into several subfreezers 17a, 17b and 17c. An overflow tube-type freezer described in OSW Report No. 113 by the Carrier Corporation is shown in the figure. There is a Sub-T.P. Vapor Liquefier Unit 18 in the second zone that is compartmentalized into several liquefiers 18a, 18b, 18c and 18d. There are a set of heat exchangers 19a, 19b, 19c and 19d in the liquefiers; there are a set of first valves 20a, 20b, 20c, and 20d that control the flow of first vapor into the liquefiers; there are a set of second valves 21a, 21b, 21c and 21d that control the flow of second vapor into the liquefiers; there are a set of refrigerant liquid valves 22a, 22b, 22c and 22d and a set of refrigerant vapor valves 23a, 23b, 23c and 23d that control the flow of refrigerant to the heat exchangers in the liquefiers; there is a set of melt drain valves 24a, 24b, 24c, and 24d in the liquefiers. There is a thin film evaporator 25 for generating second vapor in the third zone. There is a bulkhead 26 separating the first zone from the second and third zones and there is a canopy partition 27 with a bulkhead seal 28 that separates the first valve region from teh second valve region and thus, prevents the first vapor and second vapor from passing through the second valves and the first valves respectively. In each sub-freezer in the vacuum freezing zone, there is a liquid-holding container 29, a circulating pump 30 and a set of overflow tubes 31.

In operation, a feed solution is deaerated and heat exchanged with product streams and then fed into the first sub-freezer 17a. The liquid $L_1$, $L_2$ and $L_3$ overflows successively through the first, second and third sub-freezers and is discharged as a concentrated solution $L_3$. In each sub-freezer, the liquid is circulated by the pump 30 and overflows over the tubes to form a large liquid-vapor interface area. A part of the liquid flash vaporizes to form first vapor streams $V_1$, $V_2$ and $V_3$ and form slushes $K_1$, $K_2$ and $K_3$. The slushes $K_3$ and $K_2$ that are formed in the third and second sub-freezers are respectively transported to the second and first sub-freezers and the slush $K_1$ that is formed in t he first sub-freezer is discharged from the unit and is sent to a crystal washer and a crystal melter operated under a near ambient pressure.

The first vapor streams $V_1$, $V_2$ and $V_3$ are sub-triple point vapors and are combined and the combined vapor $\Sigma V_i$ is liquefied by a two-stage operation in the Sub-T.P. liquefier unit 18. As shown in the figure, the valves 20a, 20b and 20c and the second valves 21a, 21b and 21c are respectively opened and closed, and the first valve 20d and the second valve 21d are respectively closed and opened. Therefore, first vapor and second vapor are respectively introduced into the three liquefiers 18a, 18b and 18c and the remaining liquefier 18d. Referring to the first liquefier, the operations that take place are as follows:

(a) Step 1: Desublimation of the First Vapor

During this step, the first valve 20a and the second valve 21a are respectively opened and closed, the refrigerant valves 22a and 23a are opened and the melt drain valve is closed. A mass of the first vapor is introduced into the liquefier and a mass of refrigerant liquid is introduced into to heat exchanger in the liquefier. The refrigerant vaporizes and the first vapor desublimes to form a layer of desublimate on the heat exchanger surface. At the end of this step, the first valves and the refrigerant valves are closed.

(b) Step 2: Desublimate Melting

During this step, the first vapor valve 20a is closed, the second vapor valve 21a is opened, the refrigerant valves 22a and 23a are closed and the melt drain valve is opened. The second vapor enters the liquefier, condenses on the desublimate surface and melts the desublimate. The melt and the condensate form a liquid mass which is discharged through the melt drain valve and is collected at the bottom of the vacuum chamber forming a pool of liquid 32. The liquid is discharged as a purified solvent liquid 33.

The operations in other liquefiers are similar and the operations in all the liquefiers are properly staggered so that the vacuum freezing operation can be operated at least substantially continuously.

The multi-stage vacuum freezing operation described is a new way of conducting a vacuum freezing operation and is referred to as a hybrid countercurrent multi-stage vacuum freezing operation. A prior art vacuum freezing operation is either a single-stage back-mix-type operation or a regular multi-stage operation. The hybrid operation has advantages over these prior art operations. These operations are compared as follows:

(a) Single-Stage Back-Mix Vacuum Freezing Operation

In a single-stage back-mix operation, the solution in the freezer is at near the concentration at the discharge. Feed of concentration C is added to the pool of a solid-liquid mixture containing a mass of crystals and a mass of mother liquor at near the discharge concentration $C_N$. As the vacuum freezing operation progresses, a mass of first vapor and a mass of solvent crystals are formed. Let the concentration of a solution that is under a vacuum freezing operation be C, its freezing temperature be $T_f$, and the vapor pressure of the solution at the freezing temperature be $(P_v)$ and the actual pressure in the freezer be $(P_g)$, then the driving force for the vacuum freezing operation is $(P_v)-(P_g)$. The vapor pressure of a solution at its freezing temperature can be found by first finding the freezing temperature of the solution and then finding the vapor pressure of the solvent solid at the freezing temperature. Information needed can be found in Lange's *Handbook of Chemistry* and CRC's *Handbook of Chemistry and Physics*. For example, the freezing temperatures of sodium chloride solutions containing 3%, 4%, 5%, 6% and 7% solute are respectively $-1.72$ deg. C., $-2.35$ deg. C., $-2.97$ deg. C., $-3.63$ deg. C. and $-4.32$ deg. C., and the vapor pressures at their respective freezing temperatures are respectively 3.97, 3.77, 3.57, 3.39 and 3.20 mm Hg. When sea water containing 3.5% salt is subjected to a vacuum freezing operation with 50% recovery, the final discharge solution contains 7% salt. The vapor pressure of the solution at the freezing temperature is 3.20 mm Hg. When the freezer is maintained under 3.0 mm Hg, the driving force for the operation, $(P_v)-(P_g)$, is 3.20 mm Hg$-3.0$ mm Hg$=0.2$ mm Hg. The major disadvantages of a single-stage back-mix operation are as follows:

(i) The driving force for the operation is small.

(ii) The mass of crystals formed is surrounded by the most concentrated solution.

(iii) Crystals are formed from the most concentrated solution. Therefore, the sizes of the crystals are small.

(b) Regular Multi-Stage Operation

A regular multi-stage vacuum freezing operation is conducted within a multi-compartment freezer and the first vapors formed in these compartments are liquefied separately. For example, in a three-stage VFVC process, the brine concentrations in sea water desalination may be $C_1=4.5\%$, $C_2=5.5\%$ and $C_3=7\%$ in the three stages. The vapor pressures of the solutions at their freezing temperatures are respectively 3.65 mm Hg, 3.48 mm Hg and 3.2 mm Hg. The actual pressures in the three stages may be maintained at different pressures such as 3.45 mm Hg, 3.28 mm Hg and 3.0 mm Hg respectively. The driving forces in the three stages are respectively 3.65 mm Hg−3.45 Hg.=0.2 mm Hg, 3.48 mm Hg−3.28 mm Hg−0.2 mm Hg and 3.2 mm Hg−3.0 mm Hg=0.2 mm Hg. The first vapors formed in the three stages are treated separately. The major disadvantage of the regular multi-stage operation is the high equipment cost. When the regular multi-stage approach is used in the VFMPT and VFAPM Processes, several first vapor liquefaction units have to be used.

(c) The Hybrid Multi-Stage Operation

The hybrid multistage vacuum freezing operation described has the following features:

(i) The vacuum freezing operation is conducted in the multiple sub-vacuum freezers 17a, 17b and 17c. The brine concentrations in the sub-freezers $C_1$, $C_2$ and $C_3$ respectively are different.

(ii) The first vapors generated in the sub-freezers are combined into one stream and the combined stream which is a sub-triple point vapor is liquefied in one subtriple point liquefier unit.

Referring to a three-stage operation for desalinating sea water, so that $C_1=4.5\%$, $C_2=5.5\%$ and $C_3=7\%$, and the actual pressure is at 3.0 mm Hg, the driving forces in the three stages are respectively 3.65 mm Hg−3.0 mm Hg−0.65 mm Hg, 3.48 mm Hg−3.0 mm Hg=0.48 mm Hg and 3.2 mm Hg 3.0 mm Hg=0.2 mm Hg. Thus, vacuum freezing operations i the first and second stages are conducted under large driving forces, 0.65 mm Hg and 0.48 mm Hg rather than under 0.2 mm Hg. Therefore, the overall vacuum freezing rate is much higher than that of a single-stage operation and the high equipment cost of the regular multi-stage operation is avoided. The advantages of a hybrid multi-stage operation are summarized as follows:

(i) The overall rate of conducting the vacuum freezing operation is high.

(ii) A simple system of conducting the vacuum freezing operation and the two-stage first vapor liquefaction operation can be used, resulting in a low equipment cost.

(iii) Larger crystals are formed compared with the single-stage back-mix operation.

(iv) The first condensed mass discharged from the vacuum freezer contains a mass of solvent crystals and a mass of mother liquor at the first stage concentration which is generally much less concentrated than the discharge solution. The mass of crystals in the first condensed mass can be purified more easily compared to that in the single-stage back-mix operation.

FIG. 5a illustrates a horizontal cross-section of a Type 2 Sub-T.P. Vapor Processing Unit. In this unit, there is a vacuum vessel 13 that encloses a first zone 14, a second zone 15 and a third zone 16. These zones are disposed side-by-side along the longitudinal direction. These zones are respectively the vacuum freezing zone, the Sub-T.P. vapor liquefying zone and the second vapor generation zone. The structures within each zone are similar to those described in connection with the Type 1 unit. The same notations are used for designating similar parts so that the description given for the Type 1 unit can be applied also to the Type 2 unit. The Type 2 unit is particularly useful for a large VFAPM plant because the length of travel for the first vapor is made independent of the length of the unit. It is noted that a partition 34 is used to enclose the second valve region so as to prevent the first vapor from passing through the second valves and also prevent the second vapor from passing throug the first valves. In this unit, an enclosure 35 is provided for the second vapor generation zone and the partition 34 is made as an extension to the enclosure. FIG. 5b illustrates a vertical cross-section taken along the first zone; FIG. 5c illustrates a vertical cross-section taken along the second zone. It is seen that a heat exchanger made of plate-type heat exchange elements and provided with refrigerant liquid valve 22 and vapor valve 23, two first vapor valves 20 and a second vapor valve 21 are provided for each liquefier. FIGS. 5d and 5e respectively illustrate vertical cross-sections taken in the radial direction at a first vapor valve position and a second vapor valve position respectively. It is seen that the first, second and third processing zones are disposed side-by-side along the longitudinal direction; the first vapor liquefier unit 18 is compartmentalized into four liquefiers 18a, 18b, 18c and 18d. The first vapor valves 20a, 20b and 20c and the second vapor valves 21a, 21b and 21c to three liquefiers 18a, 18b and 18c are respectively opened and closed and the first and second valves 20d and 21d to the remaining liquifier are respectively closed and opened. The melt drain valve 24d of a liquefier is open while its second valve is open. Thus, first valves in three liquefiers are open to admit first vapor and desublime the first vapor and the second valve and the drain valve of the remaining liquefier are open to admit the second vapor to melt the desublime and drain the melt and condensate.

Referring to FIGS. 4a, 4b, 5a and 5b, it is seen that plate-type heat exchange elements are used both in the first vapor liquefiers and the second vapor generator. A plate-type heat exchange element refers to rectangular-shaped plate heat exchange elements such as Plate Coil elements manufactured by the Tranter Co. of Wichita Falls, Tex., and inflated plate heat transfer elements manufactured by the Tranter Co., the Rosenblad Corp. and the Mueller Corp. A Plate Coil element is fabricated from two metal sheets, one or both of which are embossed. When welded together, the embossings form a series of well-defined plate heat transfer element refers to a Temp-Plate element of the Mueller Corp., a Rosco element of the Rosenblad Corp. and an Econocoil of the Tranter Co. An inflated plate heat transfer element is fabricated from two sheets of metal by spot-welding and seam-welding followed by a hydraulic forming technique.

FIG. 6 illustrates an isometric drawing of a first vapor processing unit having a first vapor liquefier unit and a second vapor generator. The construction and operations have already been described by referring to FIGS. 5a, 5b, 5c, 5d and 5e.

In the VFAPM Process, the first condensed mass produced in the vacuum freezing step is transported from the vacuum freezing zone and is processed in a crystal washer and a crystal melter. The crystal washer may either be operated under vacuum or under a near ambient pressure. However, at least the crystal melting operation in the VFAPM Process is conducted under a near ambient pressure and there are advantages to operating both the crystal washer and melter under near ambient pressure conditions. The fact that the VFAPM Process is a Type B process and that at least its crystal melting operation is conducted under a near ambient pressure condition clearly distinguishes it from all prior art vacuum freezing processes.

The distinguishing features of the VFAPM Process are summarized as follows:

(1) Most of the prior art vacuum freezing processes such as the VFVC, VFVA, VFEA, AFVC, VFVF and VFMPT Processes are Type A processes and the VFAPM Process is a Type B process.

(2) The only Type B processes in the prior art are the VFSC Process and the VFPIM Process. The VFSC Process is a three module batch process in which crystal melting takes place under vacuum; the VFPIM Process does not use a working medium to accomplish heat reuse and its crystal melting operation is conducted under an extremely high pressure. In contrast, in the VFAPM Process, a working medium is used and at least the crystal melting operation is conducted under a convenient near ambient pressure.

The characteristic features of the Sub-Triple Point Vapor Processing Units described are summarized as follows:

(1) A horizontal vessel is used to enclose the vacuum processing zone, which comprises the first vapor generation zone, the first vapor liquefaction zone and the second vapor generation zone.

(2) There are two or more first vapor liquefiers that are operated cyclically and out of phase so that first vapor is at least substantially continuously removed from the first vapor generator. Therefore, the operation in the first vapor generator is conductor at least substantially continuously.

(3) Each first vapor liquefier has an enclosure with a top plate and the first vapor valve or valves and the second vapor valve or valves are provided on the top plate. This is a very important feature because it allows first vapor to be transported to the liquefier through a large cross-section and a short path, minimizing the pressure drop for the vapor transport. The enclosures are rectangular boxes and are laid side-by-side along the longitudinal direction of the vacuum vessel used to enclose the processing zone.

(4) Plate-type heat exchanger elements such as plate coils manufactured by the Tranter Co. of Wichita Falls, Tex., and inflated plate heat exchange elements manufactured by the Rosenblad Corp. of Princeton, N.J., the Mueller Corp. of Springfield, Mo. and the Tranter Co. are used in the first vapor liquefiers. Plate heat exchange elements fit well within the rectangular enclosures described.

(5) A thin film evaporator is used to generate second vapor which is used to melt the solid-phase mass in the condensed mass formed from the first vapor, by an in-situ melting operation.

(6) In the first type unit, the first vapor generating zone and the first vapor liquefaction zone are laid respectively from the first end and the second end of the vessel. In the second type unit, the first vapor generating zone, the first vapor liquefaction zone and the second vapor generating zone are laid side-by-side along the longitudinal direction of vacuum vessel. A first type unit is used in a small capacity plant and a second type unit is used in a large capacity plant.

FIG. 7 illustrates a crystal washer that can be operated under a near ambient pressure. It has a rectangular or cylindrical vertical vessel 34a and vertical drain tubes or drain plates 35a provided with drain openings 36 and a movable crystal harvesting blade or blades 37. A slush 39 containing a mass of solvent crystals and mother liquor is introduced into the washing unit at the bottom. The mother liquor filters through the drain openings 36 and is discharged and becomes a concentrate product 40. The crystals form a consolidated crystal bed 40a in the column and the bed is pushed upward. A mass of purified solvent 38 is applied at the top of the column to wash the crystal bed so that a mass of purified solvent solid 41 is harvested at the top by the harvesting blade 37. A crystal washer that is operated under a near ambient pressure has the following advantages over a crystal washer that is operated under vacuum:

(1) A very large capacity crystal washer operable under a near ambient pressure can be built at a much lower cost than a vacuum crystal washer.

(2) Maintenance of an ambient crystal washer is easier than maintenance of a vacuum crystal washer.

FIG. 8 illustrates a near ambient pressure crystal melter. it has a multitude of plate-type heat exchange elements 42 placed together to define narrow conduits. A heating medium is passed inside of the exchanger elements and a slush to be melted is passed through the conduits. Heat transfers from the medium to the slush to thereby melt the crystals in the slush.

FIG. 9 illustrates a packed-bed crystal melter. It has a containing vessel in which there are heat exchange elements. A heating medium 46, 47 is passed through the elements and a slush is introduced into the column at the bottom. The melt liquid is discharged through a perforated plate 48 and out the unit as a purified solvent 49.

FIG. 10 illustrates another near ambient pressure crystal melter 50 in which a slush containing solvent crystals and solvent liquid is introduced at the top of the vessel and is brought in contact with heating elements heated by a heating medium 52, 53 and the crystals in the slush are melted. The melt is discharged through a perforated plate 54 and is discharged from the melter as a mass of purified solvent 55. There is a means 56 for pushing the crystal bed downward and means 57 for retaining crystals and preventing crystal from floating.

The use of a near ambient pressure crystal melter has some advantages over the use of a vacuum crystal melter. These advantages are as follows:

(1) A very large scale, near ambient pressure crystal melter can be constructed and a large cost savings can be realized.

(2) The operations of a near ambient pressure crystal melter can be easily monitored and the unit can be easily maintained.

FIG. 11 illustrates a vertical integrated crystal washer-melter 58. The lower 59 and upper 60 parts of the column are respectively used as a crystal washer and a crystal melter. There are perforated tubes 61 or plates in the lower part of the unit and heat exchange elements 62 in the upper part of the unit. A slush is introduced in the column and the crystals are purified. The mass of purified solvent crystals are brought into contact with the heat exchange elements and the crystals are melted. The melt 63 is removed as a purified solvent product and the concentrate 64 is removed through the drain tubes. A large unit can be constructed at a low cost for operation under a near ambient pressure condition.

FIG. 12 illustrates another way of integrating an ambient pressure crystal washer 65 with an ambient pressure crystal melter 66. A slush is introduced in the crystal washer 67, a concentrate 68 is discharged and a mass of purified crystals 69 is transported from the crystal washer to the crystal melter. The crystals are melted and the melt 70 is discharged from the bottom of the melter.

For a small VFAPM plant, one may use one Sub-T.P. Vapor Processing Unit with one ambient crystal washer and one ambient crystal melter. For a large VFAPM plant, it is advantageous to use several Sub-T.P. Vapor processing Units and use one large crystal washer and one large crystal melter. FIG. 13 illustrates the layout of a large VFAPM plant. There are several Sub-T.P. Vapor Processing Units 71a, 71b, 71c, 71d, 71e and 71f, and an integrated crystal washer-melter 72. The masses of slush formed in the Sub-T.P. Vapor Processing Units are fed into the single ambient pressure washer-melter. Plant cost can be greatly reduced by this arrangement.

What we claim are as follows:

1. A process of subjecting a mixture containing a volatile solvent and one or more solutes to a hybrid counter current multi-stage vacuum freezing operation and a two-stage sub-triple point vapor liquefaction operation using a processing zone that comprises a vacuum freezing zone with two or more sub-zones, respectively denoted as Z-1, Z-2, ..., Z-N sub-zones, and a sub-triple point vapor liquefaction zone, the process consisting of the following steps:

(1) a first step of introducing feed into the Z-1 zone and placing a solid-liquid mixture in each of the sub-zones Z-1 through Z-N;
    (2) a second step of flash-vaporizing the liquid masses in the vacuum sub-zones Z-1 through Z-N to form sub-triple point vapors, denoted as first vapors $V_1$, $V_2$, ..., $V_N$ and form solvent crystals in the sub-zones;
    (3) a third step of transporting solid-liquid mixtures, denoted as $K_2$, $K_3$, ..., $K_N$, mixtures respectively from Z-2, Z-3, ..., Z-N sub-zones to Z-1, Z-2, ..., Z-(N-1) sub-zones and removing a solid-liquid mixture, denoted as $K_1$ mixture, from the Z-1 sub-zone, the $K_1$ mixture being a first condensed mass;
    (4) a fourth step of transporting liquid masses, denoted as $L_1$, $L_2$, ..., $L_{N-1}$, respectively from Z-1, Z-2, ..., Z-(N-1) subzones to Z-2, Z-3, ..., Z-N sub-zones, and removing a liquid mass $L_N$ from the Z-N sub-zone, the $L_N$ liquid being a first liquid mass;
    (5) a fifth step of combining the first vapor streams $V_1$, $V_2$, ..., $V_N$ and subjecting the resulting combined first vapor to a two-stage first vapor liquefaction step of transforming the combined first vapor into a second liquid mass in a first vapor liquefaction zone having one or more sub-zones and conducting in each sub-zone:
        (i) a first sub-step of cooling the combined first vapor without a substantial pressurization to form a second condensed mass that contains a solid phase mass of the solvent and
        (ii) a second sub-step of melting the solid phase mass in the second condensed mass by pressure isolating the liquefaction sub-zone from the vacuum freezing zone and supplying heat thereto to thereby form the second liquid mass.

2. A process of claim 1, wherein the solute of solutes in the feed mixture are substantially non-volatile, the first vapor is substantially pure solvent, the second condensed mass is a desublimate and the second liquid mass is a pure solvent liquid.

3. A sub-triple point vapor processing unit for processing a feed containing a volatile major component for (1) forming a first vapor and a first condensed mass, the first vapor being a sub-triple point vapor whose pressure is lower than the triple point pressure of the volatile major component and the first condensed mass containing at least a mass of solid phase, and
    (2) subjecting the first vapor to a two-stage liquefaction operation comprising a first step of removing heat from the first vapor without substantially pressurizing the vapor to thereby form a second condensed mass containing a mass of solid phase enriched in the volatile major component, and a second step of melting the solid mass in the second condensed mass to form a liquid mass denoted as the melt mass of the second condensed mass that comprises:

(a) a vacuum vessel enclosing a vacuum processing zone;
    (b) a first vapor generator in the vacuum freezing zone for forming the first vapor and the first condensed mass from the feed mixture;
    (c) one or more two-stage first vapor liquefiers, each having an enclosure, a heat exchanger with one or more heat exchange elements, one or more first vapor valves for controlling the flow of the first vapor into the liquefiers, means of removing and adding heat to the liquefier and a liquid drain valve for removing melt of the second condensed mass;
    (d) a first transport means for removing the first condensed mass from the first vapor generator:
    wherein the feed mixture is subjected to the following operational steps:
    (a) A first vapor generating step of vaporizing a mass of first vapor in the first vapor generator under a pressure lower than the triple point pressure of the volatile major component to thereby form the first vapor and the first condensed mass;
    (b) A two-stage vapor liquefying step of transforming the first vapor into a liquid phase mass in each liquefier comprising:
        (i) a first sub-step of introducing the first vapor without a substantial pressurization through the first valves into each liquefier and removing heat from the first vapor through the heat exchanger to thereby form the second condensed mass;
        (ii) a second sub-step of melting the solid phase mass in the second condensed mass by supplying heat to the liquefier to form a melt liquid of the second condensed mass, the melt being removed through the liquid drain valve;
    (c) A step of removing the first condensed mass from the first vapor generator.

4. A sub-triple point vapor processing unit of claim 3, wherein there are two or more first vapor liquefiers which are so operated to remove the first vapor substantially continuously, allowing the first vapor generation operation to be conducted at least substantially continuously.

5. An apparatus of claim 3, wherein the heat exchanger elements of the heat exchanger in a first vapor liquefier are plate-type heat exchanger elements.

6. An apparatus of claim 3 wherein the vacuum vessel is a horizontal vessel.

7. An apparatus of claim 6, wherein the first vapor generator and the first vapor liquefiers are laid side-by-side along the longitudinal direction of the vacuum vessel.

8. An apparatus of claim 6, wherein the vacuum vessel has a first end and a second end and the first vapor generator and the first vapor liquefiers are laid close to the first end and the second end respectively.

9. An apparatus of claim 3, wherein the first vapor generation operation is a vacuum freezing operation.

10. An apparatus of claim 3, wherein the first vapor generation operation is a distillative freezing operation.

11. An apparatus of claim 3, wherein the first vapor generation operation is a freeze-drying operation.

12. A sub-triple point vapor processing unit for processing a feed mixture containing a volatile major component for
  (1) forming a first vapor and a first condensed mass, the first vapor being a sub-triple point vapor whose pressure is lower than the triple point pressure of the volatile major component and the first condensed mass containing at least a mass of solid phase, and
  (2) subjecting the first vapor to a two-stage liquefaction operation comprising a first step of removing heat from the first vapor through a heat transfer surface without substantially pressurizing the vapor to thereby form a second condensed mass containing a mass of solid phase enriched in the volatile major component, and a second step of melting the solid phase mass in the second condensed mass to form a liquid mass denoted as the melt mass of the second condensed mass, that comprises:
  (a) a vacuum vessel enclosing a vacuum processing zone;
  (b) a first vapor generator in the vacuum processing zone for forming the first vapor and the first condensed mass from the feed mixture;
  (c) a second vapor generator in the vacuum processing zone that comprises an evaporator and means of supplying a liquid to the evaporator for generating a mass of second vapor in the amount needed to melt the solid phase mass in the second condensed mass, the second vapor being a super-triple point vapor containing the volatile major component and the pressure of the second vapor being higher than the triple point pressure of the major component;
  (d) one or more two-stage first vapor liquefiers, each having an enclosure, a heat exchanger therein, one or more first vapor valves for controlling the flow of the first vapor into the liquefier, and a liquid drain valve for removing the melt of the second condensed mass;
  (e) a first transport means for removing the first condensed mass from the first vapor generator; wherein the feed mixture is subjected to the following operational steps:
    (a) A first vapor generating step of vaporizing a mass of first vapor in the first vapor generator under a pressure lower than the triple point pressure of the volatile major component to thereby form the first vapor and the first condensed mass;
    (b) A second vapor generation step of supplying heat and a liquid to the evaporator to thereby form the second vapor;
    (c) A two-stage first vapor liquefying step of transforming the first vapor into a liquid phase mass in each liquefier comprising:
      (i) a first sub-step of introducing the first vapor without a substantial pressurization through the first valves into each liquefier and removing heat from the vapor through the heat exchanger to thereby form a second condensed mass, the refrigerant valves being open, the second vapor valves and the liquid drain valves being closed;
      (ii) a second sub-step of melting the solid phase mass in the second condensed mass by bringing the second vapor and the second condensed mass in direct heat exchange relation, the melt of the second condensed mass being drained through the liquid drain valves and the first valves and the refrigerant valves being closed;
    (d) A step of removing the first condensed mass from the first vapor generator.

13. A sub-triple point vapor processing unit of claim 12, wherein there are two or more first vapor liquefiers which are so operated to remove the first vapor substantially continuously, allowing the first vapor generation operation to be conducted at least substantially continuously.

14. A sub-triple point vapor processing unit of claim 12, wherein the enclosure of a first vapor liquefier has a top plate and at least the first valves are provided on the top plate.

15. An apparatus of claim 12, wherein the heat exchanger in a first vapor liquefier has one or more plate-type heat exchanger elements.

16. An apparatus of claim 12, wherein the evaporator provided in the second vapor generator has one or more plate-type heat exchanger elements.

17. An apparatus of claim 12, wherein the vacuum vessel is a horizontal vessel.

18. An apparatus of claim 17, wherein the second vapor generator and the first vapor liquefiers are laid side-by-side along the longitudinal direction of the vacuum vessel.

19. An apparatus of claim 17, wherein the first vapor generator and the first vapor liquefiers are laid side-by-side along the longitudinal direction of the vacuum vessel.

20. An apparatus of claim 17, wherein the first vapor generator, the first vapor liquefiers and the second vapor generator are all laid side-by-side along the longitudinal direction of the vacuum vessel.

21. An apparatus of claim 17, wherein the vacuum vessel has a first end and a second end and the first vapor generator and the first vapor liquefiers are laid close to the first end and the second end respectively.

22. An apparatus of claim 12, wherein the first vapor generation operation is a vacum freezing operation.

23. An apparatus of claim 12, wherein the first vapor generation operation is a distillative freezing operation.

24. An apparatus of claim 12, wherein the first vapor generation operation is a freeze-drying operation.

25. A sub-triple point vapor liquefaction unit for subjecting a sub-triple point vapor to a two-stage liquefaction operation comprising a first step of removing heat from the vapor without substantially pressurizing the vapor to thereby form a second condensed mass containing a mass of solid phase enriched in the major component of the vapor and a second step of melting the solid phase mass in the second condensed mass to form a liquid mass denoted as the melt mass of the second condensed mass that comprises two or more two-stage first vapor liquefiers, each having an enclosure having a top plate, a heat exchanger with heat exchange elements, a first vapor valve provided on the top plate for controlling the flow of the sub-triple point vapor into the liquefier, means of heating within the enclosure and a liquid drain valve for removing the melt of the second condensd mass, wherein the liquefiers are operable cyclically and operated out of phase so that the first vapor is at least substantially continuously introduced into the vapor liquefaction unit.

26. A sub-triple point vapor liquefaction unit of claim 25, which further comprises a second vapor generator that is a thin film evaporator, and a second vapor valve provided on the enclosure of each liquefier so that the solid phase mass in the second condensed mass is melted by bringing a mass of the second vapor in direct contact with the second condensed mass, and wherein the liquefiers are so operated to substantially continuously remove the second vapor from the second vapor generator and wherein the amount of second vapor generated is in the amount needed to melt the solid phase mass in the second condensed mass formed in the vapor liquefiers.

27. An apparatus of claim 25 or 26, wherein the heat exchanger elements used in each liquefier are plate-type heat exchange elements.

28. An apparatus of claim 26, wherein the second vapor generator is a thin film evaporator comprising one or more plate-type heat exchanger elements.

29. An apparatus of claim 28, wherein the second vapor generator and the first vapor liquefier are placed side-by side along the longitudinal direction of the unit.

30. An apparatus of any of claims 26, 28 and 29, wherein the second vapor valve for a vapor liquefier is also provided on the top plate.

31. A process of subjecting a feed containing a volatile solvent to simultaneous vaporization and crystallization operations that comprises:
(a) A vacuum freezing step (first step) of flash vaporizing the feed in a vacuum freezing zone to form a first vapor, which is a sub-triple point vapor, and a first condensed mass containing solvent crystals, the pressure of the first vapor being lower than the triple point pressure of the solvent;
(b) A two-stage vapor liquefaction step (second step) of transforming the first vapor into a first liquid condensate mass in a first vapor liquefaction zone having one or more sub-zones and conducting in each sub-zone;
i. A first sub-step of at least partially desubliming the first vapor to form a second condensed mass that include a mass of desublimate by introducing the first vapor into the sub-zone and removing heat therefrom, and
ii. A second sub-step of melting the mass of desublimate in the second condensed mass in the sub-zone by supplying heat thereto and thereby form the first liquid condensate mass;
(c) A solid transfer step (third step) of transferring the first condensed mass obtained in the first step from the vacuum freezing zone to a transfer zone that is under a pressure that is close to the ambient pressure.

32. A process of claim 31 which further comprises the following step:
(d) A crystal-melting step (fourth step) of taking a mass of solvent crystals derived from the first condensed mass in the transfer zone of the third step into a crystal melting zone and melting the solvent crystals by supplying heat thereto, the crystal melting zone being under a pressure that is close to the ambient pressure.

33. A process of claim 32 wherein there are two or more vapor liquefaction sub-zones and the operations in the sub-zones are so staggered to remove the first vapor from the vacuum freezing sub-zone at least substantially continuously, and thereby conduct both the vacuum freezing step and the crystal-melting step at least substantially continuously.

34. A process of claim 32, which further comprises the following step:
(f) A crystal-washing step (sixth step) of separating the solvent crystals from the mother liquor in the first condensed mass to form a mass of purified crystals and a solution in a crystal washing zone, wherein the mass of purified solvent crystals is melted in the crystal-melting step to become a mass of purified solvent liquid, the crystal washing zone being under a pressure that is close to the ambient pressure.

35. A process of claim 31 wherein there are two or more vapor liquefaction sub-zones and the operations in the sub-zones are so staggered to remove the first vapor from the vacuum freezing sub-zone at least substantially continuously, and thereby conduct the vacuum freezing step at least substantially continuously.

36. A process of claim 31 which further comprises the following step:
(e) A second vapor generation step, (fifth step) of transforming a mass of solvent liquid into a second vapor which is a super-triple point vapor in a second vapor generation zone by supplying heat thereto, the pressure of the second vapor being somewhat higher than the triple point pressure of the solvent; wherein the said second sub-step of the second step is conducted by bringing the second vapor in contact with the desublimate to thereby melt the desublimate and condense the second vapor, both the melt of the desublimate and the condensate becoming the first liquid condensate mass.

37. A process as in any of claims 31 through 34, wherein the solvent in the feed is water.

38. A process as in any of claims 31 through 34, wherein the solvent in the feed is a non-aqueous solvent.

39. A process as in any of claims 31 through 36, wherein the feed is chosen from a group that comprises municipal waste water sludge, aqueous gelatinous municipal waste water sludge, aqueous gelatinous substances, industrial waste sludge and organic gels.

40. A process as in any of claims 31 through 34, wherein the feed is chosen from a group that comprises acid solutions, alkali solutions, salt solutions, sea water, brackish water, sugar solutions and fruit juices.

* * * * *